United States Patent
Sollami

(10) Patent No.: US 10,612,376 B1
(45) Date of Patent: *Apr. 7, 2020

(54) BORE WEAR COMPENSATING RETAINER AND WASHER

(71) Applicant: The Sollami Company, Herrin, IL (US)

(72) Inventor: Phillip Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/879,002

(22) Filed: Jan. 24, 2018

Related U.S. Application Data

(63) Continuation-in-part of application No. 15/070,262, filed on Mar. 15, 2016, now Pat. No. 10,107,098.

(51) Int. Cl.
| | |
|---|---|
| *E21C 35/19* | (2006.01) |
| *E21C 35/197* | (2006.01) |
| *E21C 35/18* | (2006.01) |
| *F16B 43/00* | (2006.01) |
| *E21C 35/183* | (2006.01) |
| *B28D 1/18* | (2006.01) |

(52) U.S. Cl.
CPC ............ *E21C 35/197* (2013.01); *B28D 1/186* (2013.01); *E21C 35/18* (2013.01); *E21C 35/183* (2013.01); *F16B 43/00* (2013.01)

(58) Field of Classification Search
CPC ........ E21C 35/18; E21C 35/19; E21C 35/197; E21C 2035/191
See application file for complete search history.

(56) References Cited

U.S. PATENT DOCUMENTS

| | | | |
|---|---|---|---|
| 2,382,947 A | 7/1944 | Brozek | |
| 3,342,532 A | 9/1967 | Krekeler | |
| 3,397,012 A | 8/1968 | Krekeler | |
| 3,476,438 A | 11/1969 | Bower, Jr. | |
| 3,519,309 A | 7/1970 | Engle | |

(Continued)

FOREIGN PATENT DOCUMENTS

| | | |
|---|---|---|
| DE | 102004049710 | 4/2006 |
| DE | 102011079115 | 1/2013 |

(Continued)

*Primary Examiner* — Janine M Kreck
(74) *Attorney, Agent, or Firm* — Mercedes V. O'Connor; Rockman Videbeck & O'Connor

(57) ABSTRACT

A bit and/or pick that includes a collapsible slotted retainer and a non-rotating washer. The bit includes an upper body portion and a shank. The collapsible slotted retainer and the washer are disposed circumferentially about the shank of the bit. The washer is also disposed between a bottom of the upper body portion of the bit and a forward end of the retainer. The bit is inserted into a bore of a bit holder or a base block and the washer axially aligns the bit and the bit bolder or base block along a centerline to self-center the bit in the bore. As the bore becomes worn during use, the washer engages the forward end of the retainer and urges the washer away from a front face of the bit holder or base block, to collapse the retainer and increase a diameter of the retainer to approximately match a diameter of a bore of the bit holder or base block and restore the interference fit with the bore.

25 Claims, 21 Drawing Sheets

(56) References Cited

U.S. PATENT DOCUMENTS

| | | |
|---|---|---|
| 3,833,264 A | 9/1974 | Elders |
| 3,833,265 A | 9/1974 | Elders |
| 3,865,437 A | 2/1975 | Crosby |
| 4,084,856 A | 4/1978 | Emmerich |
| 4,247,150 A | 1/1981 | Wrulich et al. |
| RE30,807 E | 12/1981 | Elders |
| 4,310,939 A | 1/1982 | Iijima |
| 4,453,775 A | 6/1984 | Clemmow |
| 4,478,298 A | 10/1984 | Hake |
| 4,489,986 A | 12/1984 | Dziak |
| 4,525,178 A | 6/1985 | Hall |
| 4,561,698 A | 12/1985 | Beebe |
| 4,570,726 A | 2/1986 | Hall |
| 4,604,106 A | 8/1986 | Hall |
| 4,632,463 A | 12/1986 | Sterwerf, Jr. |
| 4,694,918 A | 9/1987 | Hall |
| 4,702,525 A | 10/1987 | Sollami |
| 4,763,956 A | 8/1988 | Emmerich |
| 4,811,801 A | 3/1989 | Salesky |
| 4,818,027 A | 4/1989 | Simon |
| 4,821,819 A | 4/1989 | Whysong |
| 4,844,550 A | 7/1989 | Beebe |
| 4,915,455 A | 4/1990 | O'Niell |
| 4,932,723 A * | 6/1990 | Mills .................... E21C 35/183 299/104 |
| 4,944,559 A | 7/1990 | Sionett |
| 5,067,775 A | 11/1991 | D'Angelo |
| 5,088,797 A | 2/1992 | O'Neill |
| 5,098,167 A | 3/1992 | Latham |
| 5,159,233 A | 10/1992 | Sponseller |
| 5,161,627 A | 11/1992 | Burkett |
| 5,273,343 A | 12/1993 | Ojanen |
| 5,287,937 A | 2/1994 | Sollami |
| 5,302,005 A | 4/1994 | O'Neill |
| 5,303,984 A | 4/1994 | Ojanen |
| 5,352,079 A | 10/1994 | Croskey |
| 5,370,448 A | 12/1994 | Sterwerf, Jr. |
| 5,374,111 A | 12/1994 | Den Besten |
| 5,415,462 A | 5/1995 | Massa |
| 5,417,475 A | 5/1995 | Graham et al. |
| 5,458,210 A | 10/1995 | Sollami |
| 5,484,191 A | 1/1996 | Sollami |
| 5,492,188 A | 2/1996 | Smith et al. |
| 5,551,760 A | 9/1996 | Sollami |
| 5,607,206 A | 3/1997 | Siddle |
| 5,628,549 A | 5/1997 | Ritchey |
| 5,720,528 A | 2/1998 | Ritchey |
| 5,725,283 A | 3/1998 | O'Neill |
| 5,823,632 A | 10/1998 | Burkett |
| 5,924,501 A | 7/1999 | Tibbitts |
| 5,931,542 A | 8/1999 | Britzke |
| 5,934,854 A | 8/1999 | Krautkremer et al. |
| 5,992,405 A | 11/1999 | Sollami |
| D420,013 S | 2/2000 | Warren |
| 6,019,434 A | 2/2000 | Emmerich |
| 6,102,486 A | 8/2000 | Briese |
| 6,176,552 B1 | 1/2001 | Topka, Jr. |
| 6,196,340 B1 | 3/2001 | Jensen et al. |
| 6,199,451 B1 | 3/2001 | Sollami |
| 6,250,535 B1 | 6/2001 | Sollami |
| 6,331,035 B1 | 12/2001 | Montgomery, Jr. |
| 6,341,823 B1 | 1/2002 | Sollami |
| 6,357,832 B1 | 3/2002 | Sollami |
| 6,371,567 B1 | 4/2002 | Sollami |
| 6,382,733 B1 | 5/2002 | Parrott |
| 6,428,110 B1 | 8/2002 | Ritchey et al. |
| 6,508,516 B1 | 1/2003 | Kammerer |
| D471,211 S | 3/2003 | Sollami |
| 6,585,326 B2 | 7/2003 | Sollami |
| 6,685,273 B1 | 2/2004 | Sollami |
| 6,692,083 B2 | 2/2004 | Latham |
| D488,170 S | 4/2004 | Sollami |
| 6,733,087 B2 | 5/2004 | Hall |
| 6,739,327 B2 | 5/2004 | Sollami |
| 6,786,557 B2 | 9/2004 | Montgomery |
| 6,824,225 B2 | 11/2004 | Stiffler |
| 6,846,045 B2 | 1/2005 | Sollami |
| 6,854,810 B2 | 2/2005 | Montgomery |
| 6,866,343 B2 | 3/2005 | Holl et al. |
| 6,968,912 B2 | 11/2005 | Sollami |
| 6,994,404 B1 | 2/2006 | Sollami |
| 7,097,258 B2 | 8/2006 | Sollami |
| 7,118,181 B2 | 10/2006 | Frear |
| 7,150,505 B2 | 12/2006 | Sollami |
| 7,195,321 B1 | 3/2007 | Sollami |
| 7,210,744 B2 | 5/2007 | Montgomery |
| 7,229,136 B2 | 6/2007 | Sollami |
| 7,234,782 B2 | 6/2007 | Stehney |
| D554,162 S | 10/2007 | Hall |
| 7,320,505 B1 | 1/2008 | Hall |
| 7,338,135 B1 | 3/2008 | Hall |
| 7,347,292 B1 | 3/2008 | Hall |
| D566,137 S | 4/2008 | Hall |
| 7,353,893 B1 | 4/2008 | Hall |
| 7,384,105 B2 | 6/2008 | Hall |
| 7,396,086 B2 | 6/2008 | Hall |
| 7,401,862 B2 | 7/2008 | Holl et al. |
| 7,401,863 B1 | 7/2008 | Hall |
| 7,410,221 B2 | 8/2008 | Hall |
| 7,413,256 B2 | 8/2008 | Hall |
| 7,413,258 B2 | 8/2008 | Hall |
| 7,419,224 B2 | 9/2008 | Hall |
| 7,445,294 B2 | 11/2008 | Hall |
| D581,952 S | 12/2008 | Hall |
| 7,464,993 B2 | 12/2008 | Hall |
| 7,469,756 B2 | 12/2008 | Hall |
| 7,469,971 B2 | 12/2008 | Hall |
| 7,469,972 B2 | 12/2008 | Hall |
| 7,475,948 B2 | 1/2009 | Hall |
| 7,523,794 B2 | 4/2009 | Hall |
| 7,568,770 B2 | 8/2009 | Hall |
| 7,569,249 B2 | 8/2009 | Hall |
| 7,571,782 B2 | 8/2009 | Hall |
| 7,575,425 B2 | 8/2009 | Hall |
| 7,588,102 B2 | 9/2009 | Hall |
| 7,594,703 B2 | 9/2009 | Hall |
| 7,600,544 B1 | 10/2009 | Sollami |
| 7,600,823 B2 | 10/2009 | Hall |
| 7,628,233 B1 | 12/2009 | Hall |
| 7,635,168 B2 | 12/2009 | Hall |
| 7,637,574 B2 | 12/2009 | Hall |
| 7,648,210 B2 | 1/2010 | Hall |
| 7,665,552 B2 | 2/2010 | Hall |
| 7,669,938 B2 | 3/2010 | Hall |
| 7,681,338 B2 | 3/2010 | Hall |
| 7,712,693 B2 | 5/2010 | Hall |
| 7,717,365 B2 | 5/2010 | Hall |
| 7,722,127 B2 | 5/2010 | Hall |
| 7,789,468 B2 | 9/2010 | Sollami |
| 7,832,808 B2 | 11/2010 | Hall |
| 7,883,155 B2 | 2/2011 | Sollami |
| 7,950,745 B2 | 5/2011 | Sollami |
| 7,963,617 B2 | 6/2011 | Hall |
| 7,992,944 B2 | 8/2011 | Hall |
| 7,992,945 B2 | 8/2011 | Hall |
| 7,997,660 B2 | 8/2011 | Monyak et al. |
| 7,997,661 B2 | 8/2011 | Hall |
| 8,007,049 B2 | 8/2011 | Fader |
| 8,007,051 B2 | 8/2011 | Hall |
| 8,029,068 B2 | 10/2011 | Hall |
| 8,033,615 B2 | 10/2011 | Hall |
| 8,033,616 B2 | 10/2011 | Hall |
| 8,038,223 B2 | 10/2011 | Hall |
| 8,061,784 B2 | 11/2011 | Hall |
| 8,109,349 B2 | 2/2012 | Hall |
| 8,118,371 B2 | 2/2012 | Hall |
| 8,136,887 B2 | 3/2012 | Hall |
| 8,201,892 B2 | 6/2012 | Hall |
| 8,215,420 B2 | 7/2012 | Hall |
| 8,292,372 B2 | 10/2012 | Hall |
| 8,414,085 B2 | 4/2013 | Hall |
| 8,449,039 B2 | 5/2013 | Hall |
| 8,485,609 B2 | 7/2013 | Hall |
| 8,500,209 B2 | 8/2013 | Hall |

(56) References Cited

U.S. PATENT DOCUMENTS

| | | |
|---|---|---|
| 8,540,320 B2 | 9/2013 | Sollami |
| RE44,690 E | 1/2014 | Sollami |
| 8,622,482 B2 | 1/2014 | Sollami |
| 8,622,483 B2 | 1/2014 | Sollami |
| 8,646,848 B2 | 2/2014 | Hall |
| 8,728,382 B2 | 5/2014 | Hall |
| 9,004,610 B2 | 4/2015 | Erdmann et al. |
| 9,028,008 B1 | 5/2015 | Bookhamer |
| 9,039,099 B2 | 5/2015 | Sollami |
| 9,316,061 B2 | 4/2016 | Hall |
| 9,879,531 B2 | 1/2018 | Sollami |
| 9,909,416 B1 | 3/2018 | Sollami |
| 10,107,098 B2 * | 10/2018 | Sollami ................. E21C 35/197 |
| 10,260,342 B1 | 4/2019 | Sollami |
| 10,323,515 B1 | 6/2019 | Sollami |
| 10,337,324 B2 | 7/2019 | Sollami |
| 10,370,966 B1 | 8/2019 | Sollami |
| 10,385,689 B1 | 8/2019 | Sollami |
| 10,415,386 B1 | 9/2019 | Sollami |
| 10,502,056 B2 | 12/2019 | Sollami |
| 2002/0074850 A1 | 6/2002 | Montgomery, Jr. |
| 2002/0074851 A1 | 6/2002 | Montgomery, Jr. |
| 2002/0109395 A1 | 8/2002 | Sollami |
| 2002/0167216 A1 | 11/2002 | Sollami |
| 2002/0192025 A1 | 12/2002 | Johnson |
| 2003/0015907 A1 | 1/2003 | Sollami |
| 2003/0047985 A1 * | 3/2003 | Stiffler ................. E21C 35/197 299/102 |
| 2003/0052530 A1 | 3/2003 | Sollami |
| 2003/0122414 A1 | 7/2003 | Sollami |
| 2003/0209366 A1 | 11/2003 | McAlvain |
| 2004/0004389 A1 | 1/2004 | Latham |
| 2004/0174065 A1 | 9/2004 | Sollami |
| 2005/0212345 A1 | 9/2005 | Sleep et al. |
| 2006/0071538 A1 | 4/2006 | Sollami |
| 2006/0186724 A1 | 8/2006 | Stehney |
| 2006/0261663 A1 | 11/2006 | Sollami |
| 2007/0013224 A1 | 1/2007 | Stehney |
| 2007/0040442 A1 | 2/2007 | Weaver |
| 2007/0052279 A1 | 3/2007 | Sollami |
| 2008/0035386 A1 | 2/2008 | Hall et al. |
| 2008/0036276 A1 * | 2/2008 | Hall ..................... E21C 35/183 299/104 |
| 2008/0036283 A1 | 2/2008 | Hall et al. |
| 2008/0100124 A1 | 5/2008 | Hall et al. |
| 2008/0145686 A1 | 6/2008 | Mirchandani |
| 2008/0164747 A1 | 7/2008 | Weaver et al. |
| 2008/0284234 A1 | 11/2008 | Hall et al. |
| 2009/0146491 A1 | 6/2009 | Fader et al. |
| 2009/0160238 A1 | 6/2009 | Hall et al. |
| 2009/0256413 A1 | 10/2009 | Majagi |
| 2009/0261646 A1 | 10/2009 | Ritchie et al. |
| 2010/0045094 A1 | 2/2010 | Sollami |
| 2010/0244545 A1 | 9/2010 | Hall |
| 2010/0253130 A1 | 10/2010 | Sollami |
| 2010/0320003 A1 | 12/2010 | Sollami |
| 2010/0320829 A1 | 12/2010 | Sollami |
| 2011/0006588 A1 | 1/2011 | Monyak et al. |
| 2011/0089747 A1 | 4/2011 | Helsel |
| 2011/0175430 A1 | 7/2011 | Heiderich et al. |
| 2011/0204703 A1 | 8/2011 | Sollami |
| 2011/0254350 A1 | 10/2011 | Hall |
| 2012/0001475 A1 | 1/2012 | Dubay et al. |
| 2012/0027514 A1 | 2/2012 | Hall |
| 2012/0056465 A1 | 3/2012 | Gerer et al. |
| 2012/0068527 A1 | 3/2012 | Erdmann |
| 2012/0104830 A1 | 5/2012 | Monyak et al. |
| 2012/0181845 A1 | 7/2012 | Sollami |
| 2012/0242136 A1 | 9/2012 | Ojanen |
| 2012/0248663 A1 | 10/2012 | Hall |
| 2012/0261977 A1 | 10/2012 | Hall |
| 2012/0280559 A1 | 11/2012 | Watson |
| 2012/0286559 A1 | 11/2012 | Sollami |
| 2012/0319454 A1 | 12/2012 | Swope |
| 2013/0169023 A1 | 7/2013 | Monyak |
| 2013/0181501 A1 | 7/2013 | Hall et al. |
| 2013/0199693 A1 | 8/2013 | Tank et al. |
| 2013/0307316 A1 | 11/2013 | Roetsch et al. |
| 2014/0035346 A1 | 2/2014 | Fundakowski et al. |
| 2014/0110991 A1 | 4/2014 | Sollami |
| 2014/0232172 A1 | 8/2014 | Roth et al. |
| 2014/0262541 A1 | 9/2014 | Parsana et al. |
| 2014/0326516 A1 | 11/2014 | Haugvaldstad |
| 2015/0028656 A1 | 1/2015 | Sollami |
| 2015/0035343 A1 | 2/2015 | Ojanen |
| 2015/0137579 A1 | 5/2015 | Lachmann et al. |
| 2015/0198040 A1 | 7/2015 | Voitic et al. |
| 2015/0240634 A1 | 8/2015 | Sollami |
| 2015/0285074 A1 | 10/2015 | Sollami |
| 2015/0292325 A1 | 10/2015 | Sollami |
| 2015/0300166 A1 | 10/2015 | Ries et al. |
| 2015/0308488 A1 | 10/2015 | Kahl |
| 2015/0315910 A1 | 11/2015 | Sollami |
| 2015/0354285 A1 | 12/2015 | Hall |
| 2016/0102550 A1 | 4/2016 | Paros et al. |
| 2016/0194956 A1 | 7/2016 | Sollami |
| 2016/0229084 A1 | 8/2016 | Lehnert |
| 2016/0237818 A1 | 8/2016 | Weber et al. |
| 2017/0089198 A1 | 3/2017 | Sollami |
| 2017/0101867 A1 | 4/2017 | Hall et al. |

FOREIGN PATENT DOCUMENTS

| | | |
|---|---|---|
| DE | 202012100353 | 6/2013 |
| DE | 102015121953 | 7/2016 |
| DE | 102016118658 | 3/2017 |
| EP | 3214261 | 9/2017 |
| GB | 1114156 | 5/1968 |
| GB | 2483157 | 2/2012 |
| GB | 2534370 | 7/2016 |
| WO | 2008105915 A2 | 9/2008 |
| WO | 2008105915 A3 | 9/2008 |
| WO | 2009006612 | 1/2009 |

* cited by examiner

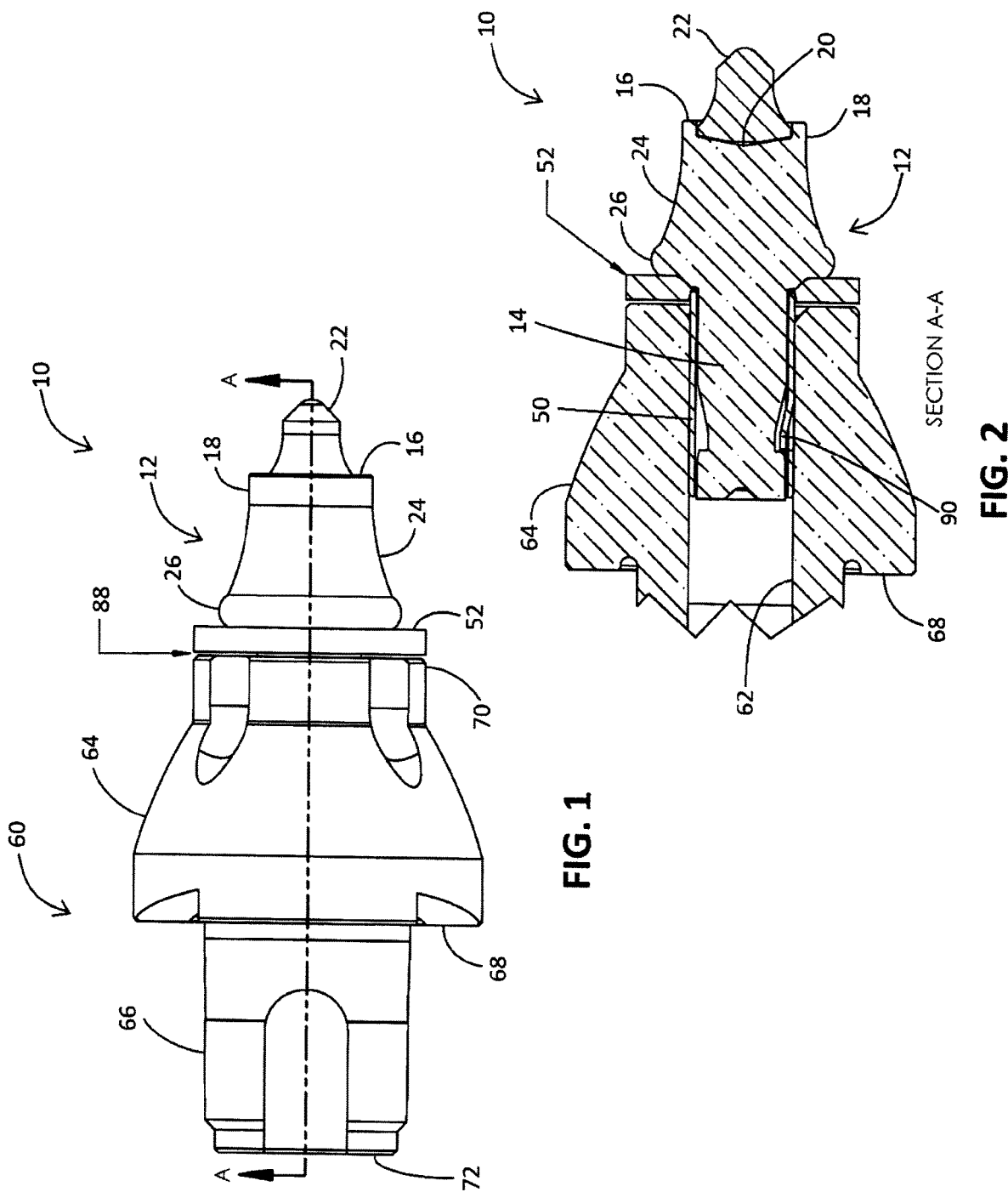

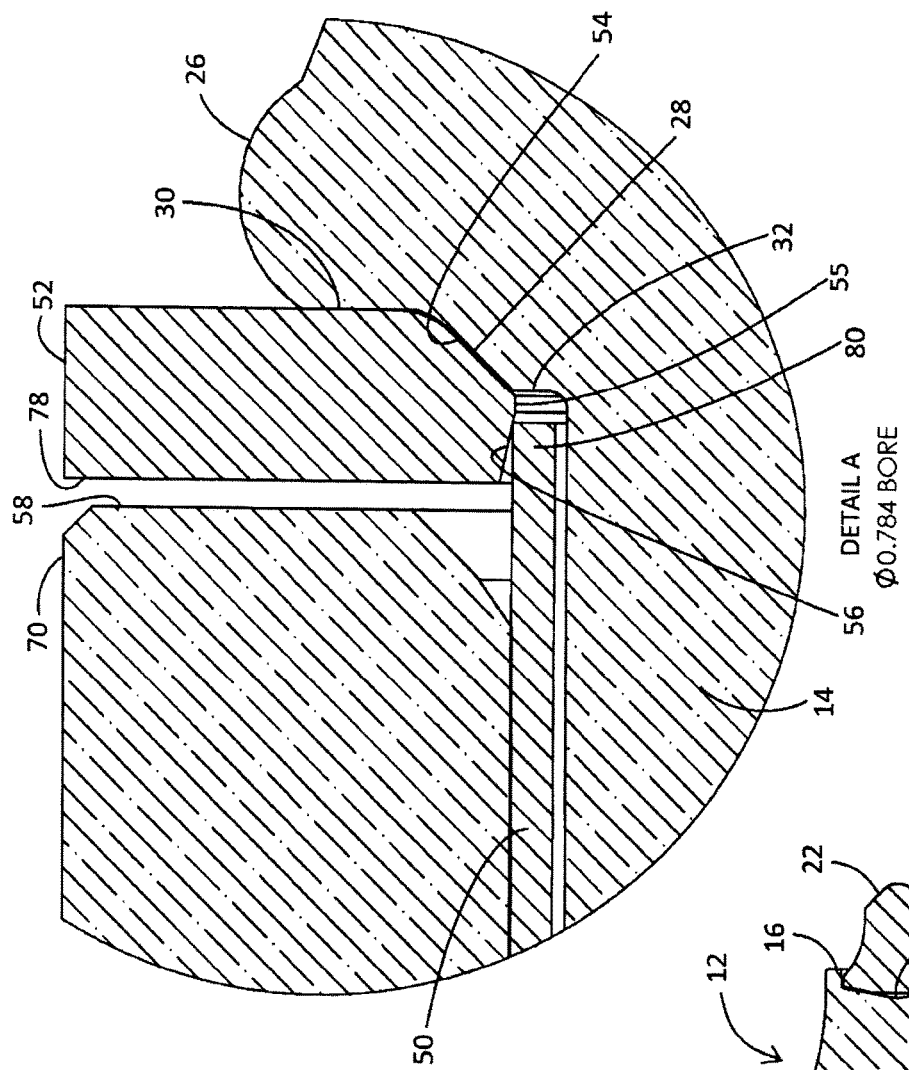
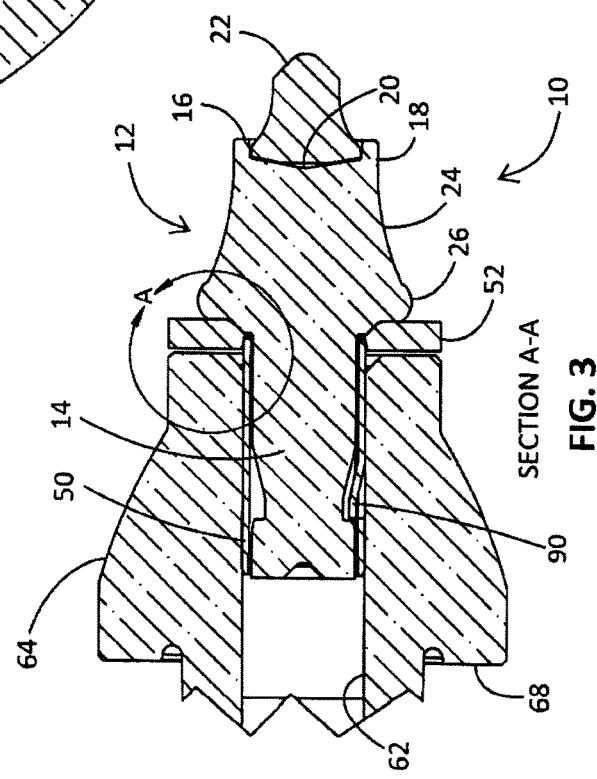
FIG. 4
FIG. 3

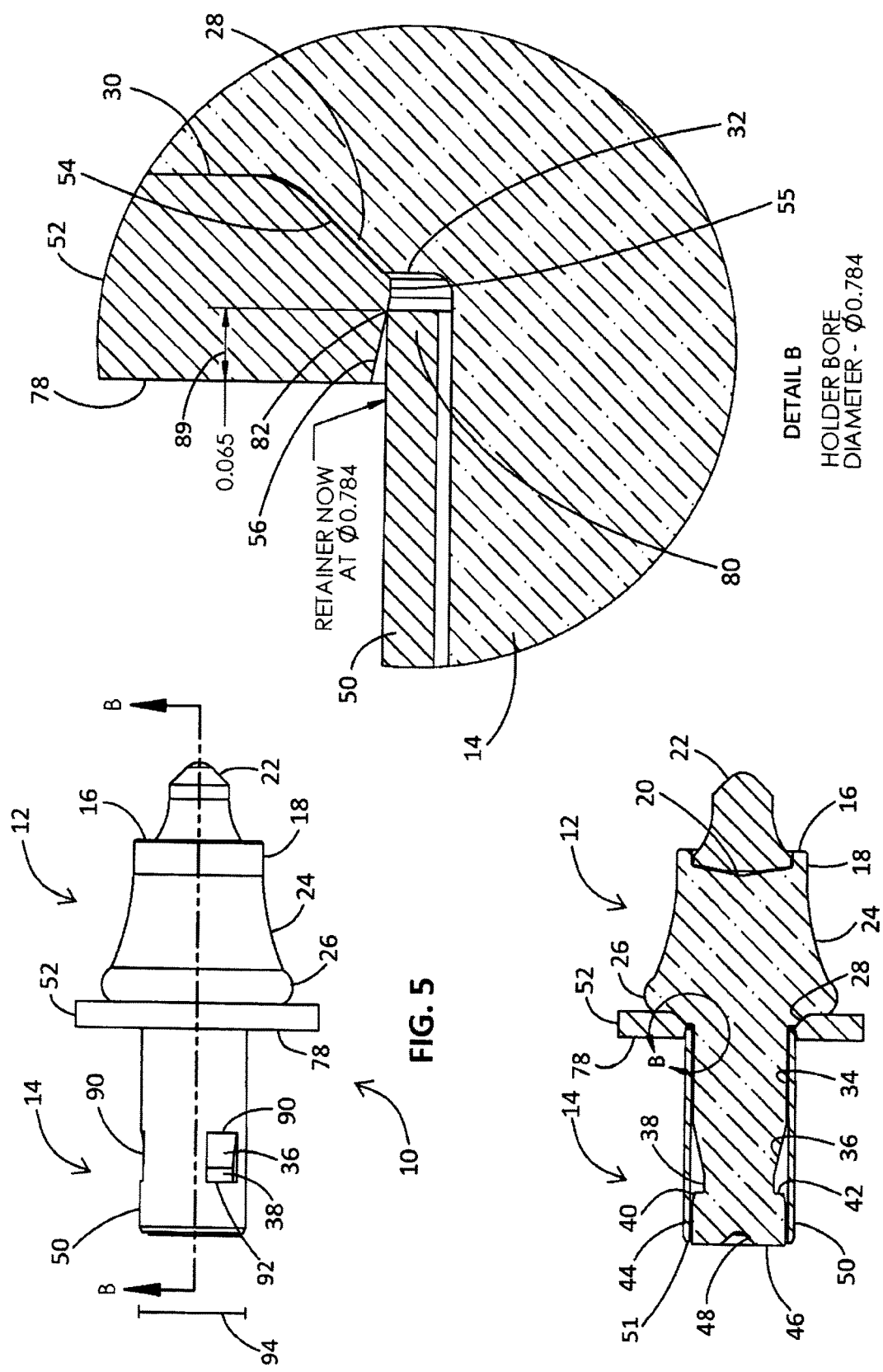

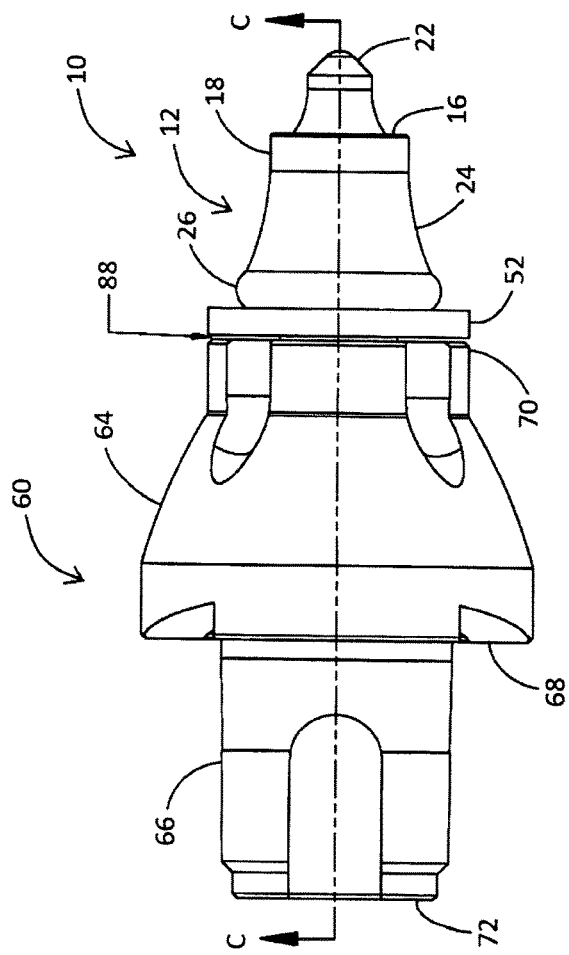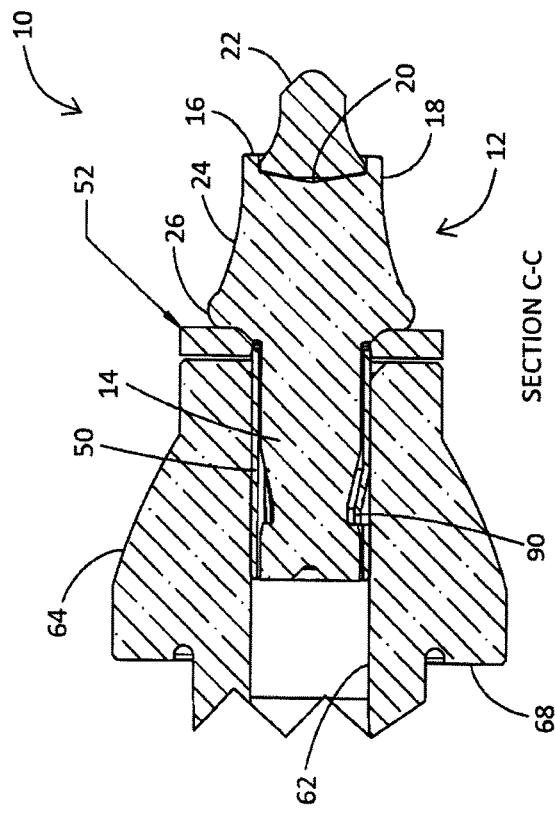
FIG. 9
FIG. 10
SECTION C-C

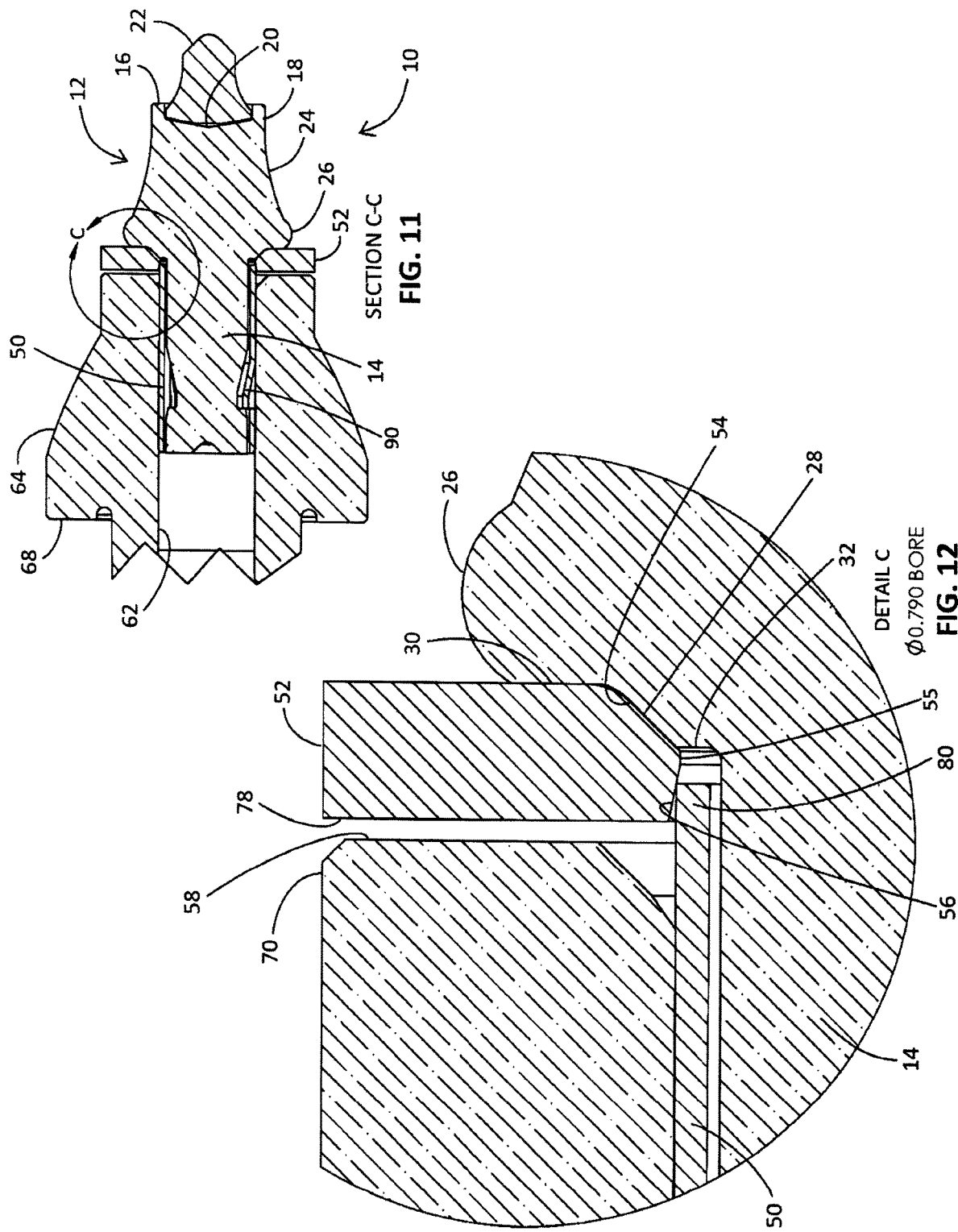

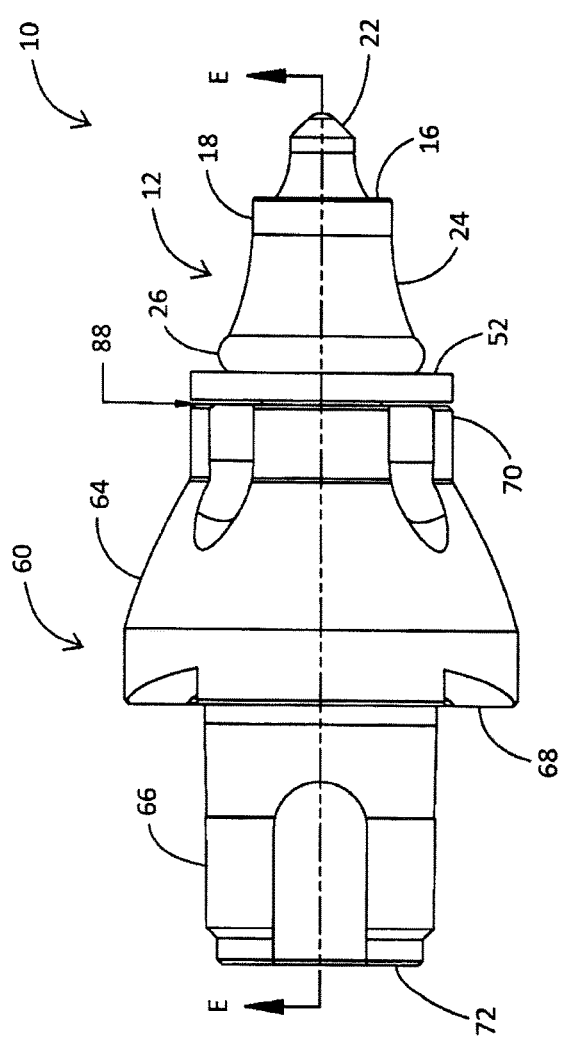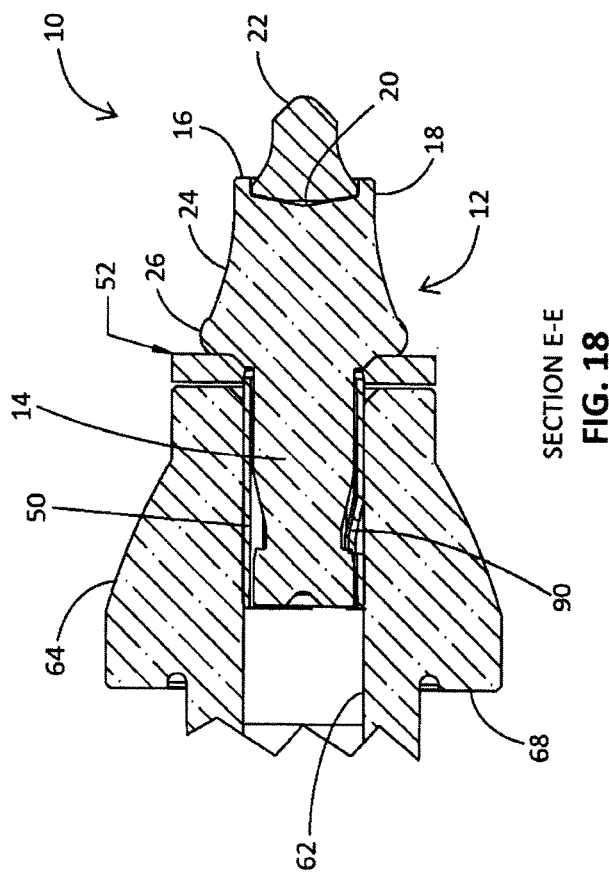
FIG. 17
SECTION E-E
FIG. 18

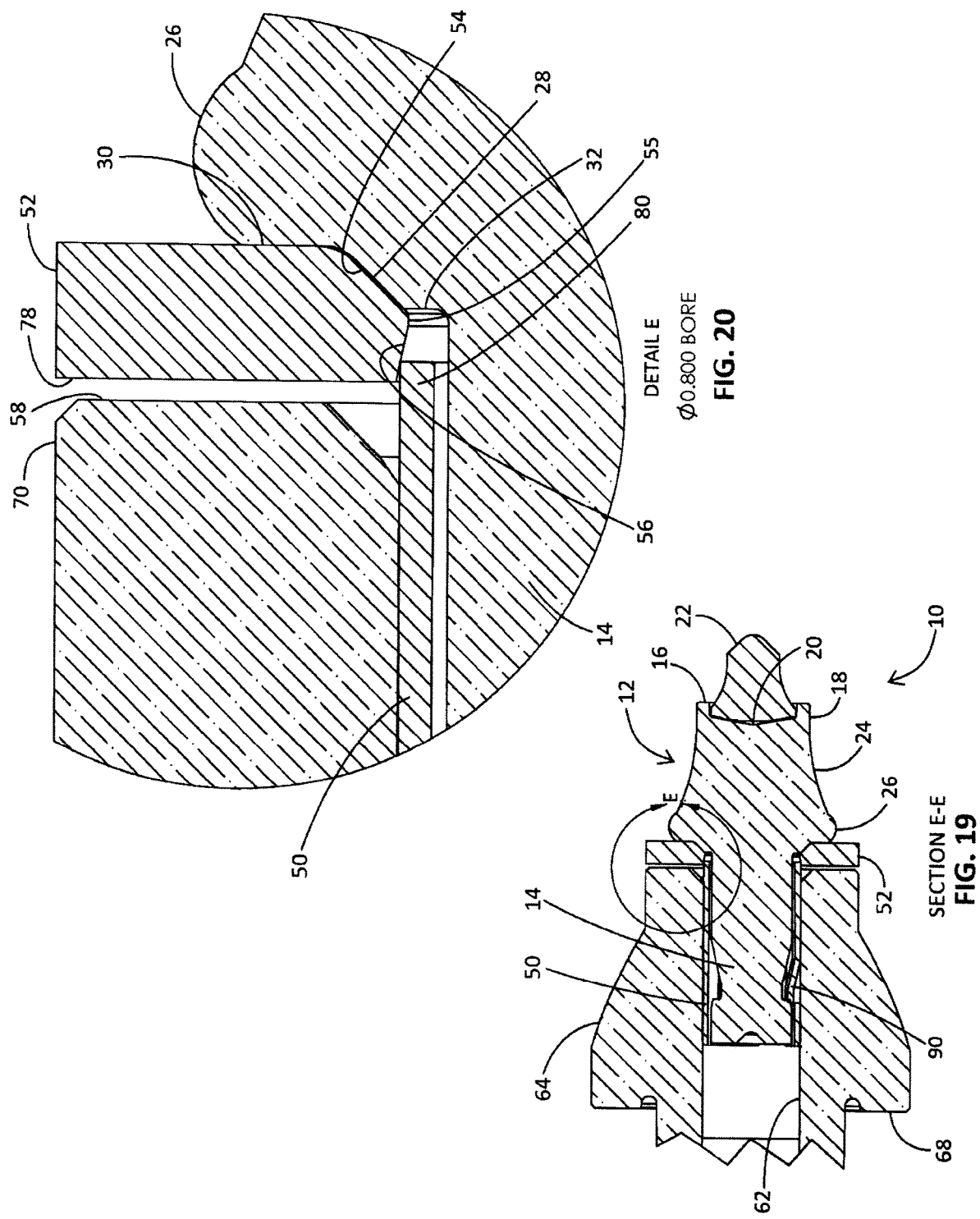

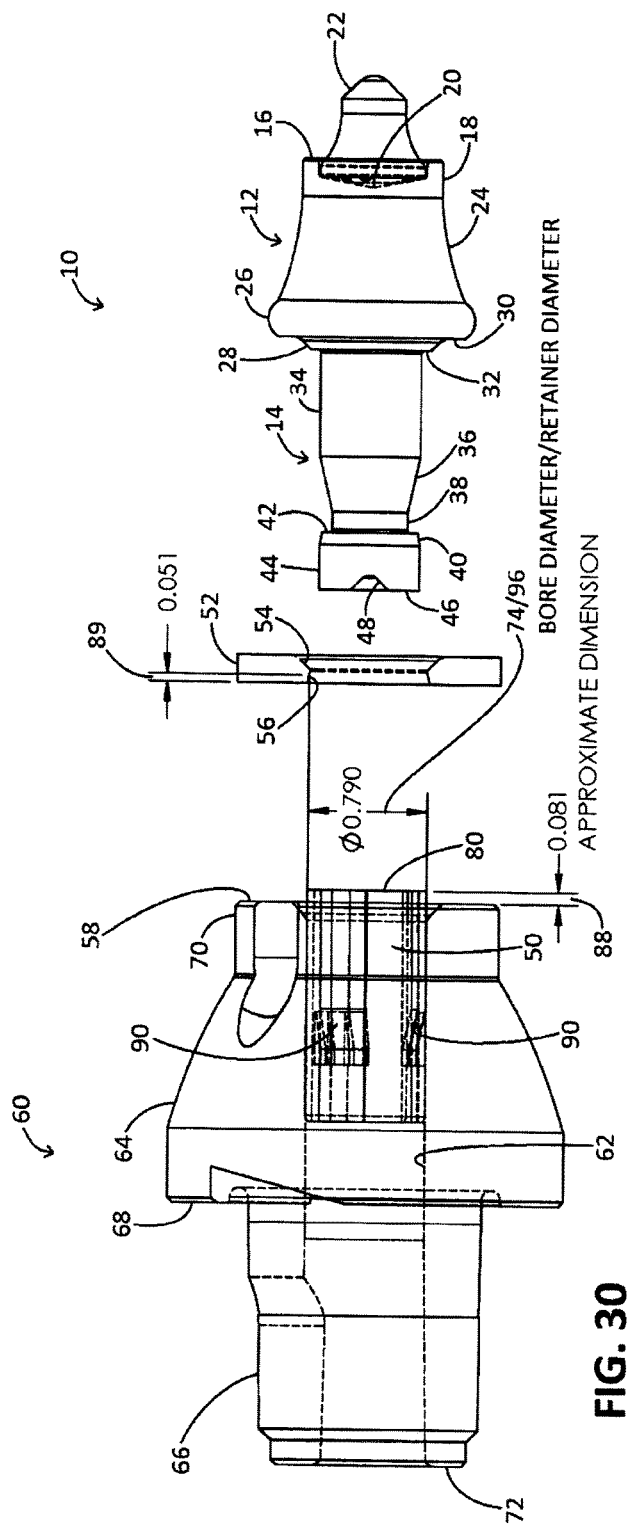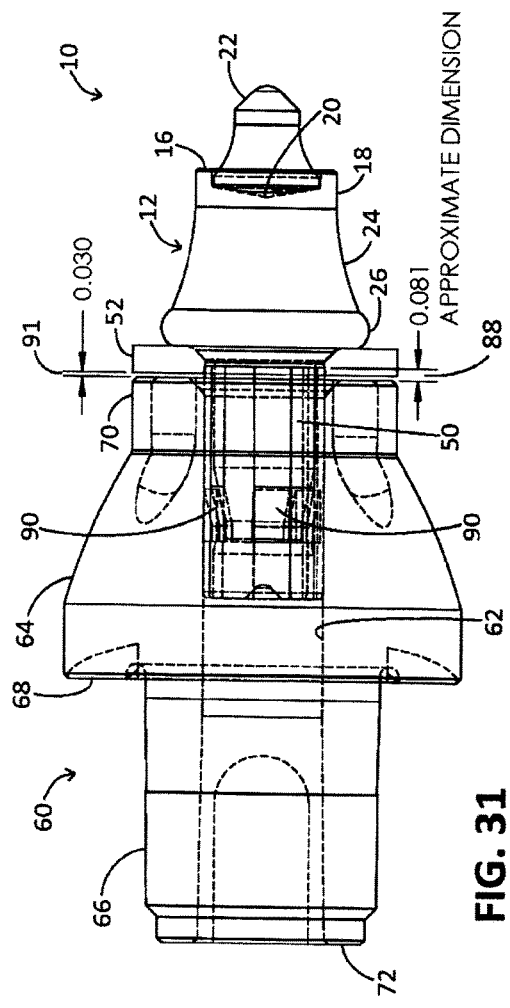
FIG. 30
FIG. 31

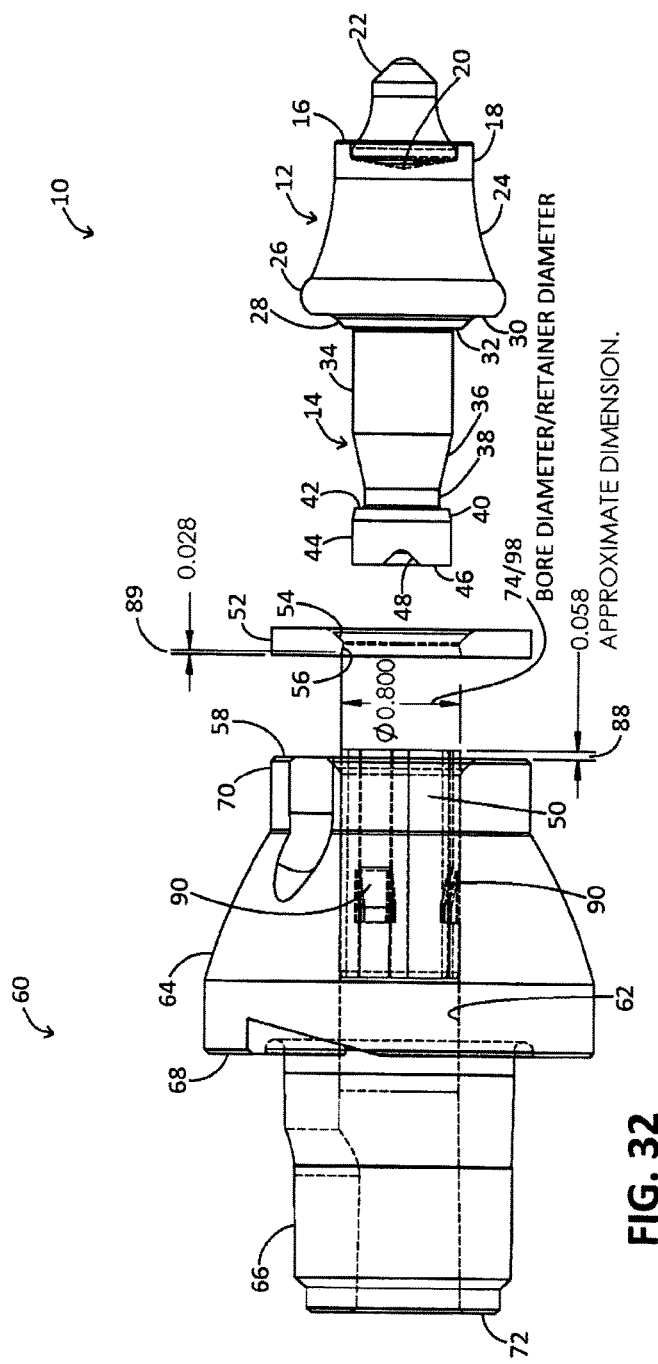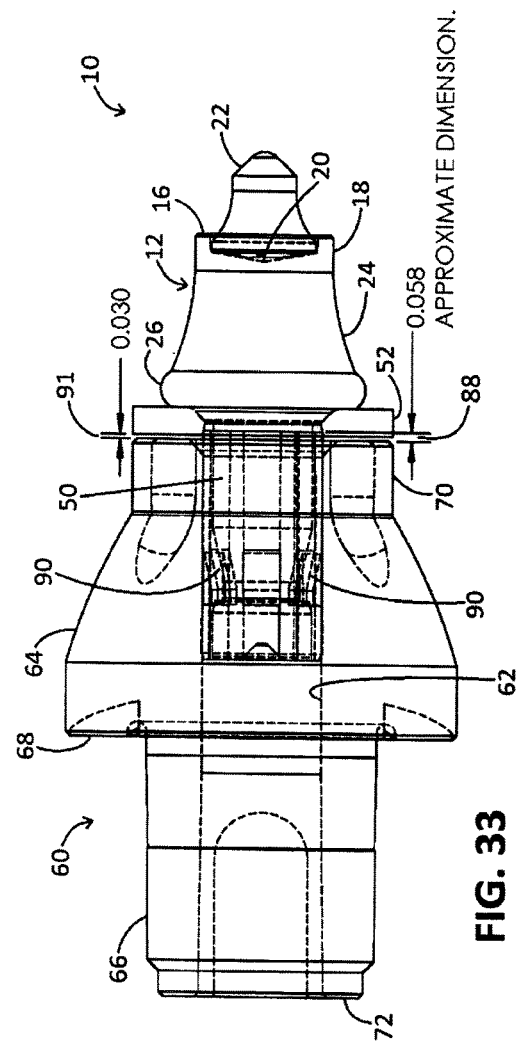
FIG. 32
FIG. 33

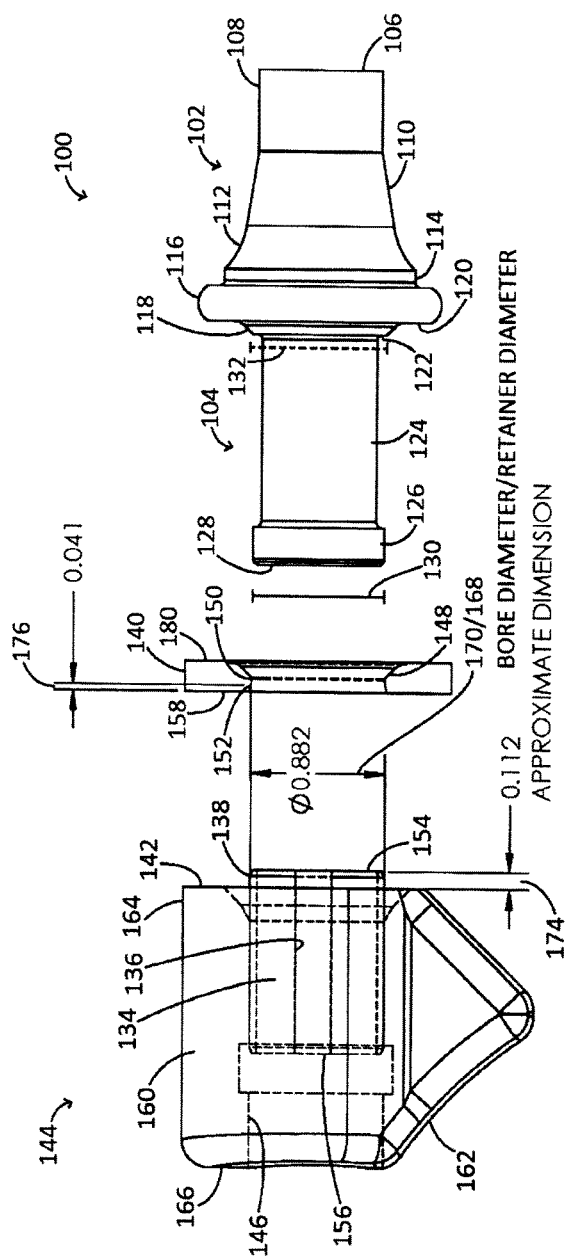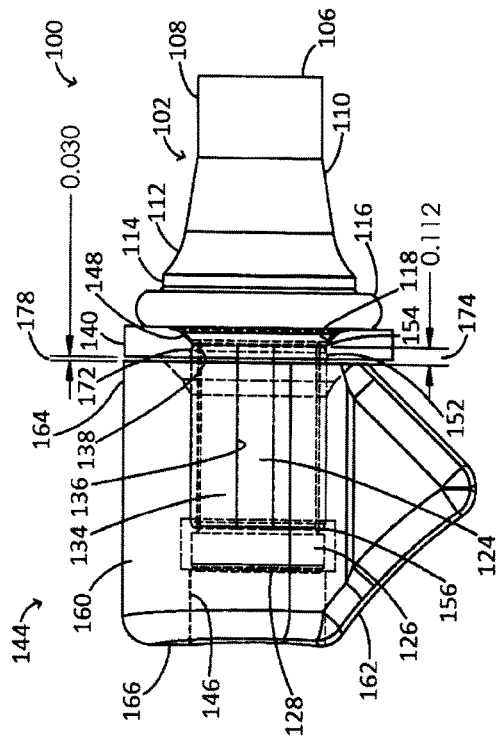

SECTION A-A

BORE WEAR COMPENSATING RETAINER AND WASHER

CROSS-REFERENCE TO RELATED APPLICATION(S)

This application claims priority to and is a continuation-in-part of U.S. Non-provisional application Ser. No. 15/070,262, filed Mar. 15, 2016, to the extent allowed by law and the contents of which are incorporated herein by reference in their entireties.

TECHNICAL FIELD

This disclosure relates to bit and/or pick assemblies for road milling, mining, and trenching equipment.

BACKGROUND

Road milling, mining, and trenching equipment utilizes bits and/or picks traditionally set in a bit assembly. Bit assemblies can include a bit and/or pick retained within a bore in a base bock. Bit assemblies can also include a bit and/or pick retained by a bit holder and the bit holder retained within a bore in a base block. A plurality of the bit assemblies are mounted on the outside of a rotatable drum, typically in a V-shaped or spiral configuration. A plurality of the bit assemblies can also be mounted on an endless chain and plate configurations. The combinations of bit assemblies have been utilized to remove material from the terra firma, such as degrading the surface of the earth, minerals, cement, concrete, macadam or asphalt pavement. Individual bits and/or picks, bit holders, and base blocks may wear down or break over time due to the harsh road degrading environment. Additionally, the forces and vibrations exerted on the bit assemblies may cause the bit and/or pick to wear away the bore in the base block, the bit and/or pick to wear away the bore in the bit holder, or the bit holder to wear away the bore in the base block. As a result, the diameter of the bore of the base block, or the diameter of the bore in the bit holder, increases over time, decreasing the interference contact between the bit and/or pick and the bore of the base block, the bit and/or pick and the bore of the bit holder, or the bit holder and the bore of the base block, thereby damaging the bit holder or base block and requiring replacement of the bit holder or base block long before the standard minimum lifetime required by the industry.

To prolong the life of the bit assembly, and the bit holder and/or the base block, a bit and/or pick comprising a diametrically expanding retainer circumferentially disposed around a shank of the bit and/or pick is provided to maintain the interference contact between the bore of the base block or the bore of the bit holder as the diameter of the bore of the base block or the diameter of the bore of the bit holder block, respectively, increases from use. The bit and/or pick also includes a washer around the shank of the bit and/or pick adapted to engage a forward outer surface of the retainer to achieve alignment between the shank of the bit and/or pick and the bore of the bit holder or base block. All components associated with the bit are replaced with each bit exchange. The bit holder or base block remains unchanged. The service life of the bore and base of the bit holder or base block are substantially increased due to the non-rotating washer, due to the bore wear compensation, and due to the coaxial alignment of the shank of the bit.

SUMMARY

This disclosure relates generally to bit and/or pick assemblies for road milling, mining, and trenching equipment.

One implementation of the teachings herein is a retainer that includes a generally cylindrical hollow body portion including a first end and a second end; a slot axially extending through a sidewall of the body portion along a length of the body portion; and the body portion adapted to be disposed circumferentially about a shank of a bit.

In another implementation of the teachings herein is a washer that includes a generally cylindrical body portion including a first surface and a second surface; a bore axially extending from the first surface to the second surface of the body portion; a first inner portion of the bore, the first inner portion subjacent the first surface of the body portion; a second inner portion of the bore, the second inner portion subjacent the first inner portion of the bore; a third inner portion of the bore, the third inner portion subjacent the second inner portion of the bore; and the washer adapted to be disposed circumferentially about a shank of a bit and adapted to provide near centerline alignment of the bit and a bit holder.

In yet another implementation of the teachings herein is a bit that includes an upper body portion; a generally cylindrical shank axially depending from the upper body portion; a retainer disposed circumferentially about the shank, the retainer comprising a slot axially extending along a length of the retainer; and a washer disposed circumferentially about the shank, the washer disposed between the upper body portion and a first end of the retainer.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

FIG. 1 is a top elevation view of a first illustrated embodiment of a bit and a washer, the bit shown retained within a bore of a bit holder, in accordance with implementations of this disclosure;

FIG. 2 is a partial cross-sectional view of the first illustrated embodiment of the bit and the washer taken along Line A-A of FIG. 1, the bit shown with a retainer disposed around a shank of the bit and the bit shown retained within the bore of the bit holder, in accordance with implementations of this disclosure;

FIG. 3 is a partial cross-sectional view of the first illustrated embodiment of the bit and the washer taken along Line A-A of FIG. 1, the bit shown with the retainer disposed around the shank of the bit, the bit shown retained within the bore of the bit holder, and showing Detail A, in accordance with implementations of this disclosure;

FIG. 4 is a detail cross-sectional view of Detail A of the first illustrated embodiment of the bit and the washer of FIG. 3, the bit shown with the retainer disposed around the shank of the bit and the bit shown retained within the bore of the bit holder when the diameter of the bore is approximately 0.784 inch, in accordance with implementations of this disclosure;

FIG. 5 is a top elevation view of the first illustrated embodiment of the bit and the washer, shown with the retainer disposed around the forward end of a shank of the bit when assembled into the bore of the bit holder, in accordance with implementations of this disclosure;

FIG. 6 is a cross-sectional view of the first illustrated embodiment of the bit and the washer taken along Line B-B of FIG. 5, the bit shown with the retainer disposed around the shank of the bit and showing Detail B, in accordance with implementations of this disclosure;

FIG. 7 is a detail cross-sectional view of Detail B of the first illustrated embodiment of the bit and the washer of FIG. 6, the bit shown with the retainer disposed around the shank of the bit when the diameter of the retainer is approximately 0.784 inch, in accordance with implementations of this disclosure;

FIG. 9 is a top elevation view of the first illustrated embodiment of the bit and the washer, the bit shown retained within the bore of the bit holder when the bore is worn approximately 0.006 inches, in accordance with implementations of this disclosure;

FIG. 10 is a partial cross-sectional view of the first illustrated embodiment of the bit and the washer taken along Line C-C of FIG. 9, the bit shown with the retainer disposed around the shank of the bit and the bit shown retained within the bore of the bit holder when the bore is worn approximately 0.006 inches, in accordance with implementations of this disclosure;

FIG. 11 is a partial cross-sectional view of the first illustrated embodiment of the bit and the washer taken along Line C-C of FIG. 9, the bit shown with the retainer disposed around the shank of the bit, the bit shown retained within the bore of the bit holder, and showing Detail C, in accordance with implementations of this disclosure;

FIG. 12 is a detail cross-sectional view of Detail C of the first illustrated embodiment of the bit and the washer of FIG. 11, the bit shown with the retainer disposed around the shank of the bit and the bit shown retained within the bore of the bit holder when the bore is worn approximately 0.006 inches and the diameter of the bore is approximately 0.790 inch, in accordance with implementations of this disclosure;

FIG. 17 is a top elevation view of the first illustrated embodiment of the bit and the washer, the bit shown retained within the bore of the bit holder when the bore is worn approximately 0.016 inches, in accordance with implementations of this disclosure;

FIG. 18 is a partial cross-sectional view of the first illustrated embodiment of the bit and the washer taken along Line E-E of FIG. 17, the bit shown with the retainer disposed around the shank of the bit and the bit shown retained within the bore of the bit holder when the bore is worn approximately 0.016 inches, in accordance with implementations of this disclosure;

FIG. 19 is a partial cross-sectional view of the first illustrated embodiment of the bit and the washer taken along Line E-E of FIG. 17, the bit shown with the retainer disposed around the shank of the bit, the bit shown retained within the bore of the bit holder when the bore is worn approximately 0.016 inches, and showing Detail E, in accordance with implementations of this disclosure;

FIG. 20 is a detail cross-sectional view of Detail E of the first illustrated embodiment of the bit and the washer of FIG. 19, the bit shown with the retainer disposed around the shank of the bit and the bit shown retained within the bore of the bit holder when the bore is worn approximately 0.016 inches and the diameter of the bore and the diameter of the retainer are approximately 0.800 inch, in accordance with implementations of this disclosure;

FIG. 30 is an exploded view of the first illustrated embodiment of the bit and the washer, the retainer of the bit shown retained within the bore of the bit holder when the diameter of the bore and the diameter of the retainer are approximately 0.790 inch, in accordance with implementations of this disclosure;

FIG. 31 is an elevation view of the first illustrated embodiment of the bit, assembled with the washer and retainer, when the diameter of the bore and the diameter of the retainer are approximately 0.790 inch, in accordance with implementations of this disclosure;

FIG. 32 is an exploded view of the first illustrated embodiment of the bit and the washer, the retainer of the bit shown retained within the bore of the bit holder when the diameter of the bore and the diameter of the retainer are approximately 0.800 inch, in accordance with implementations of this disclosure;

FIG. 33 is an elevation view of the first illustrated embodiment of the bit, assembled with the washer and retainer, when the diameter of the bore and the diameter of the retainer are approximately 0.800 inch, in accordance with implementations of this disclosure;

FIG. 35 is an exploded side elevation view of the second illustrated embodiment of the bit and the washer, the retainer of the bit shown retained within the bore of the base block when the bore of the base block is approximately 0.882 inches, and showing invisible internal elements in dotted lines, in accordance with implementations of this disclosure;

FIG. 36 is an elevation view of the second illustrated embodiment of the bit, the retainer, and the washer, shown after insertion of the bit in the bore of the base block, and showing invisible internal elements in dotted lines, in accordance with implementations of this disclosure;

DETAILED DESCRIPTION

Figure 8:
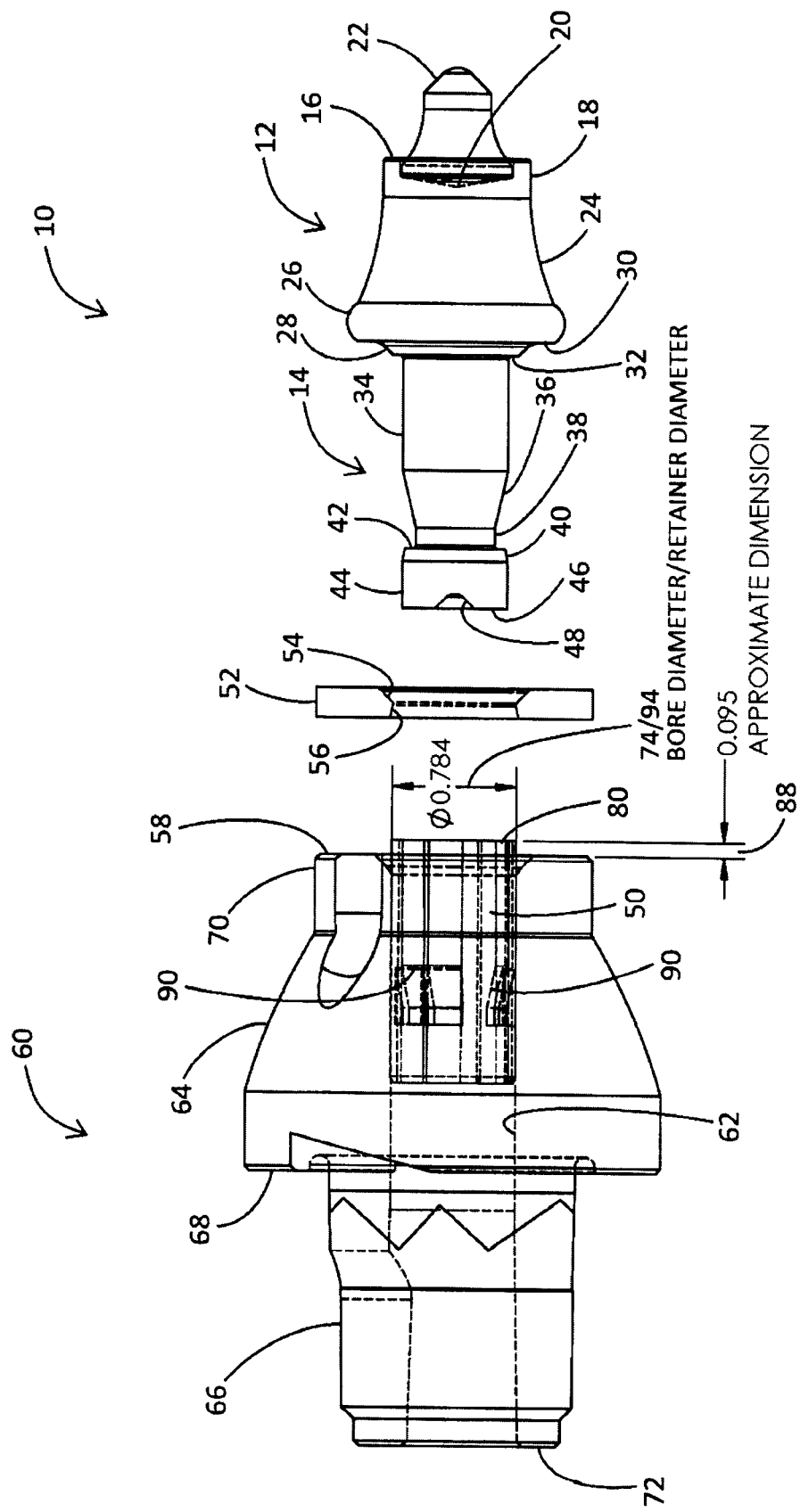
FIG. 8 is an exploded view of the first illustrated embodiment of the bit and the washer, the retainer of the bit shown retained within the bore of the bit holder when the diameter of the bore and the diameter of the retainer are approximately 0.784 inch, in accordance with implementations of this disclosure.
Figure 15:
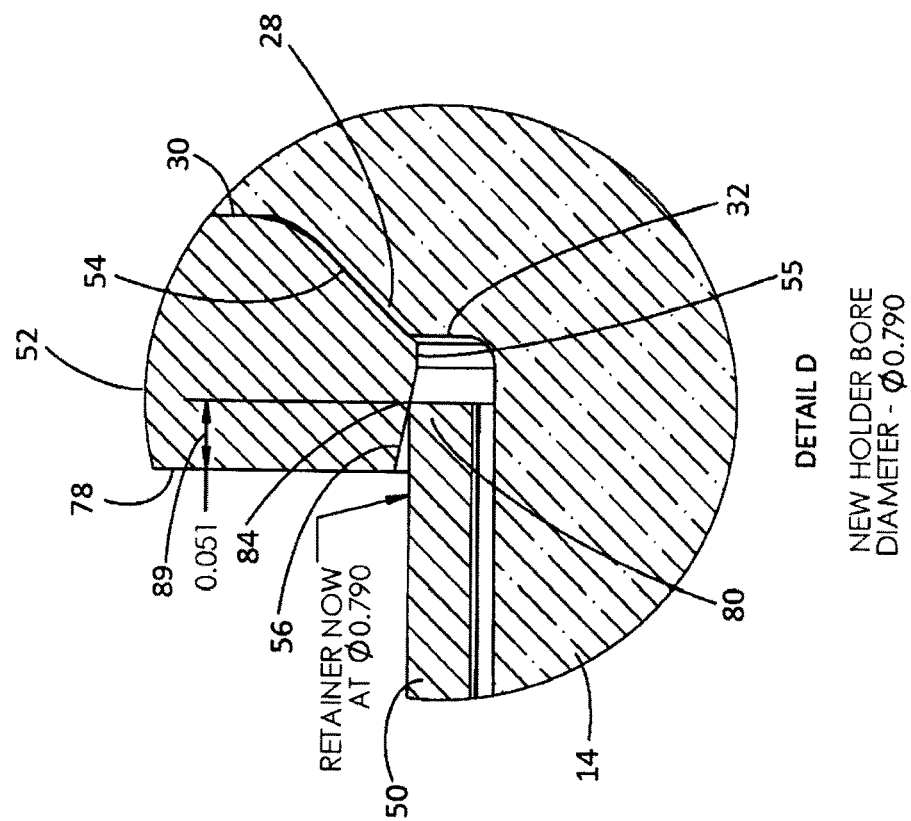
FIG. 15 is a detail cross-sectional view of Detail D of the first illustrated embodiment of the bit and the washer of FIG. 14, the bit shown with the retainer disposed around the shank of the bit when the bore of the bit holder is worn approximately 0.006 inches and the diameter of the retainer is approximately 0.790 inch, in accordance with implementations of this disclosure.
Figure 13:
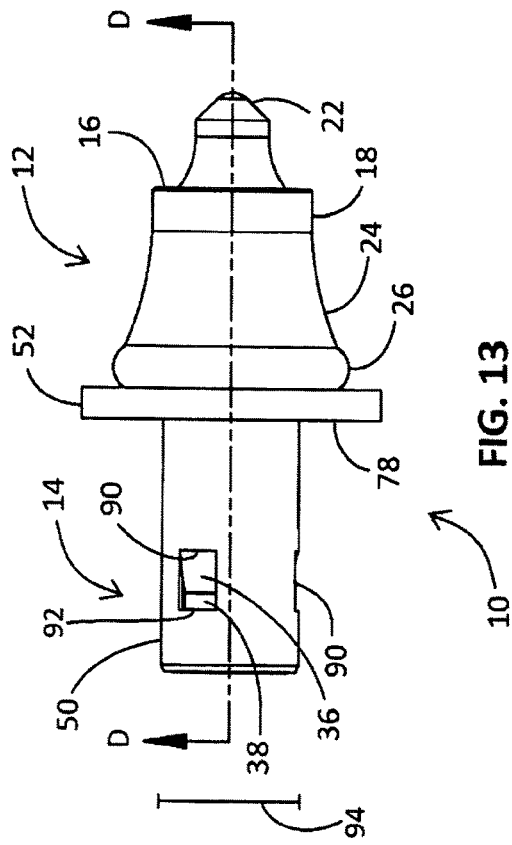
FIG. 13 is a top elevation view of the first illustrated embodiment of the bit and the washer, shown with the retainer disposed around the forward end of the shank of the bit when assembled into the bore of the bit holder, in accordance with implementations of this disclosure.
Figure 14:
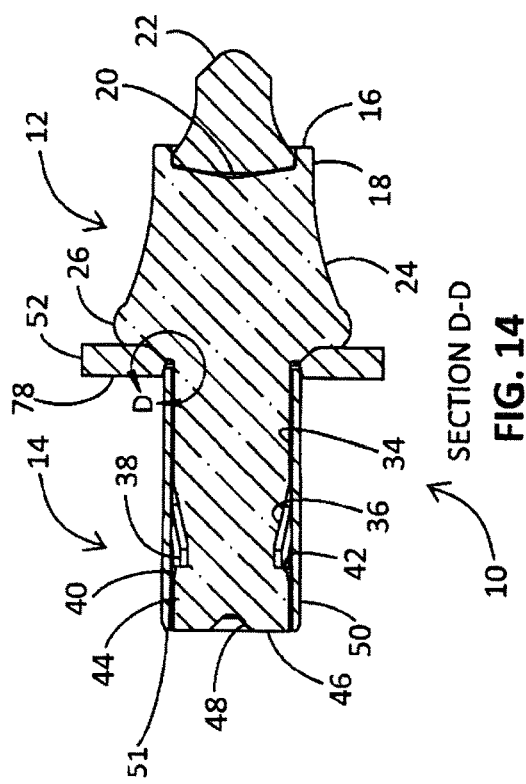
FIG. 14 is a cross-sectional view of the first illustrated embodiment of the bit and the washer taken along Line D-D of FIG. 13, the bit shown with the retainer disposed around the shank of the bit and showing Detail D, in accordance with implementations of this disclosure.

Road milling, mining, and trenching equipment utilizes bits and/or picks traditionally set in a bit assembly. In some embodiments, bit assemblies can include a bit and/or pick that includes a shank retained within a bore in a base block. In other embodiments, bit assemblies can include the bit and/or pick that includes the shank retained within a bore of a bit holder and the bit holder retained within the bore of the base block or bit holder block. The combinations of bit assemblies have been utilized to remove material from the terra firma, such as degrading the surface of the earth, minerals, cement, concrete, macadam or asphalt pavement. Individual bits and/or picks, bit holders, and bit holder blocks may wear down or break over time due to the harsh road degrading environment. Forces, vibrations, and loose abrasive materials exerted on the bit assemblies may cause the shank of the bit and/or pick to wear away the bore of the base block and/or may cause the shank of the bit and/or pick to wear away the bore of the bit holder. As a result, the diameter of the bore of the base block or the diameter of the bore of the bit holder increases over time, decreasing, if not eliminating, the acceptable interference contact between the shank of the bit and/or pick and the bore of the base block or the bore of the bit holder block and damaging the base block or bit holder, respectively. The damage to the base block or bit holder may require replacement of the base block or the bit holder, respectively, long before the standard minimum lifetime required by the industry. One important aspect of the present disclosure is to provide a bit and/or pick comprising a diametrically expanding retainer circumferentially disposed around a shank of the bit and/or pick, the retainer adapted to maintain the interference contact between the bit and/or pick and the base block or the bit and/or pick and the bit holder as the diameter of the bore of the base block or the diameter of the bore of the bit holder, respectively, increases from use, thereby prolonging the life of the base block, or bit holder, and the bit assembly. Another important aspect of the present disclosure is to provide a washer disposed about the forward end of the shank of the bit and/or pick adapted to engage a forward outer surface of the retainer to achieve alignment between the shank of the bit and the bore of the bit holder or base block and to prevent the washer from rotating, thereby drastically reducing the nose wear on the base block or bit holder.

Referring to FIGS. 5, 6, 8, 13, 14, 16, 21, 22, and 24, a first illustrated embodiment of a bit 10 comprises a bit body 12 and a bit shank 14 axially depending from a bottom of the bit body 12. The bit body 12 is generally cylindrical or generally annular in shape and comprises an annular or generally cylindrical top surface 16, such as a nearly flat annular top surface in the first illustrated embodiment, adjacent to an upper body portion 18 that includes an annular or generally cylindrical trough 20 in which to retain a bit tip 22. A mediate body portion 24 subjacent the upper body portion 18 generally slopes axially and radially outwardly to a radially extending generally arcuate tire portion 26. A decreased diameter tapered distal portion 28 extends from a first flange 30, subjacent to the tire portion 26, to a second flange 32. The first flange 30 and the second flange 32 may be flat annular or generally cylindrical flanges as shown in this first illustrated embodiment.

The shank 14, shown in FIGS. 2-8, 10-16, 18-24, and 25-27, axially depends from the second flange 32 subjacent the decreased diameter tapered distal portion 28 of the bit body 12 and is axially aligned with the bit body 12. The shank 14 comprises a generally cylindrical first segment 34 that axially extends from the second flange 32 adjacent the decreased diameter tapered distal portion 28 to a tapered second segment 36. The second segment 36 axially extends from the first segment 34 to a generally cylindrical third segment 38. The third segment 38 axially extends from the second segment 36 to a third flange 42. A tapered fourth segment 40, subjacent the third flange 42, axially extends to a generally cylindrical fifth segment 44 that is adjacent to a distal end 46 of the shank 14. The fifth segment 44 includes a notch 48 that extends inwardly from the distal end 46. In other embodiments, the shank 14 can be cylindrical or can include tapered and arcuate segments.

The shank 14 includes a coaxial and generally cylindrical collapsible slotted retainer 50, shown in FIGS. 2-8, 10-16, 18-24, and 25-27, that is disposed circumferentially about the shank 14. The retainer 50 is generally made from spring steel or other hardenable material with an elasticity that allows the retainer 50 to return to its nearly original shape despite significant deflection or twisting. The axial length of the retainer 50 is approximately the same length as the shank 14 in the first illustrated embodiment. In alternate embodiments, the retainer 50 may be slightly longer or shorter than the shank 14. The retainer 50 comprises a slot (not shown) that axially extends along the length of the retainer 50 and creates a narrow gap between opposing sidewalls of the slot. The retainer 50 comprises at least one tab 90 that is a predetermined distance from a distal end 51 (FIGS. 2, 3, 5, 8, 10, 11, 13, 16, 18, 19, 21 and 24). The at least one tab 90 is inwardly positioned on a portion of the retainer 50 outer wall. The at least one tab 90 is adapted to engage a recess on the shank 14 to prevent the retainer 50 from being removed from the shank 14 when the bit 10 is extracted from a bore 62 of a bit holder 60. In another embodiment, the retainer 50 comprises at least one aperture (not shown) that is a predetermined distance from the distal end 51 of the retainer 50. In yet another embodiment, the retainer 50 simply comprises a generally cylindrical collapsible body portion and a slot that axially extends along the length of the retainer 50 and creates a narrow gap between opposing sidewalls of the slot. The axial length from the second flange 32 (FIG. 7) to a distal end 92 (FIGS. 5, 13, and 21) of the at least one tab 90 (FIG. 5) or at least one aperture (not shown) is slightly less than the axial length from the second flange 32 to the third flange 42 (FIG. 6).

A washer 52, that comprises an anti-rotation design, is disposed circumferentially about the retainer 50 and the shank 14 and is adapted to cover and protect a front face 58 of the bit holder 60 and to provide near perfect centerline alignment of the bit 10 and the bore 62 of bit holder 60, or a base block in another implementation. A bore (not shown) of the washer 50 includes a first inner portion 54, a second generally cylindrical or slightly flat second inner portion 55, and a third inner portion 56, shown in FIGS. 4, 7, 12, 15, 20, and 23, where the first inner portion 54 is adjacent the second inner portion 55 and the third inner portion 56 is subjacent the second inner portion 55. The first inner portion 54 is tapered to comprise the same, similar, or complementary dimensions as the dimensions of the decreased diameter tapered distal portion 28. The diameter of the forward end 80 of the retainer 50 is larger than the diameter of the third inner portion 56. The third inner portion 56 comprises a reverse taper such that the angle of the reverse taper is adapted to urge the washer 52 away from the front face 58 of the bit holder 60 until the retainer 50 is fully inserted and an interference contact or interference fit is formed between the retainer 50 and the bore 62 of the bit holder 60. Additionally, the third inner portion 56 of the washer 52 surrounds the forward end 80 of the retainer 50 and creates a nearly 100% seal against the bore 62 cavity of the bit holder 60, which is adapted to prevent particles and debris from entering the bore 62 cavity and prevent additional bore wear.

The angle of the first inner portion 54 of the washer 52 creates a seat for the washer 52 to the bit body 12. The angle of the third inner portion 56 of the washer 52 determines how far away the washer 52 is from the front face 58 of the bit holder 60 and how much the third inner portion 56 can collapse the retainer 50 into the bore 62 of the bit holder 60. Additionally, the angle of the third inner portion 56 of the washer 52 also creates a spring force by providing a radial compressive feature adapted to provide axial shock absorbing characteristics because the washer 52 is spaced away from the front face 58 of the bit holder 60. Changing the strength and the hardness of the steel of the retainer 50 and changing the angle of the third inner portion 56 of the washer 52, varies the distance the retainer 50 extends into the bit holder 60. The angle of the third inner portion 56 of the washer 52 is variable in order to change how far the retainer 50 extends into the bit holder 60.

In one exemplary implementation of the first illustrated embodiment, the first inner portion 54 of the washer 52 locates nearly on a 45 degree angle located on the decreased diameter tapered distal portion 28 subjacent the first flange 30 and tire portion 26. In this implementation, the third inner portion 56 of the washer 52 comprises a slight angle which intersects a rear face 78 of the washer 52 with the slight angular third inner portion 56 engaging the forward end 80 of the retainer 50 to achieve alignment between the shank 14 of the bit 10 and the bore 62 of the bit holder 60.

The bit holder 60, shown in FIGS. 1, 8, 9, 16, 17, and 24-27, comprises a forward body portion 64 and a generally cylindrical shank 66 axially depending from a bottom 68 of the forward body portion 64. The forward body portion 64 is generally cylindrical or generally annular in shape and comprises the front face 58 at a forward end 70 of the forward body portion 64. The forward body portion 64 and the shank 66 are axially aligned about the bore 62 of the bit holder 60, which extends from the forward end 70 of the bit holder 60 to a distal end 72 of the bit holder 60 in the first illustrated embodiment. In this first illustrated embodiment, the diameter of the bore 62 varies along the length of the bore 62 between the forward end 70 and the distal end 72 of the bit holder 60. In alternate embodiments, the diameter of the bore 62 may be continuous along the length of the bore 62.

Figure 25:
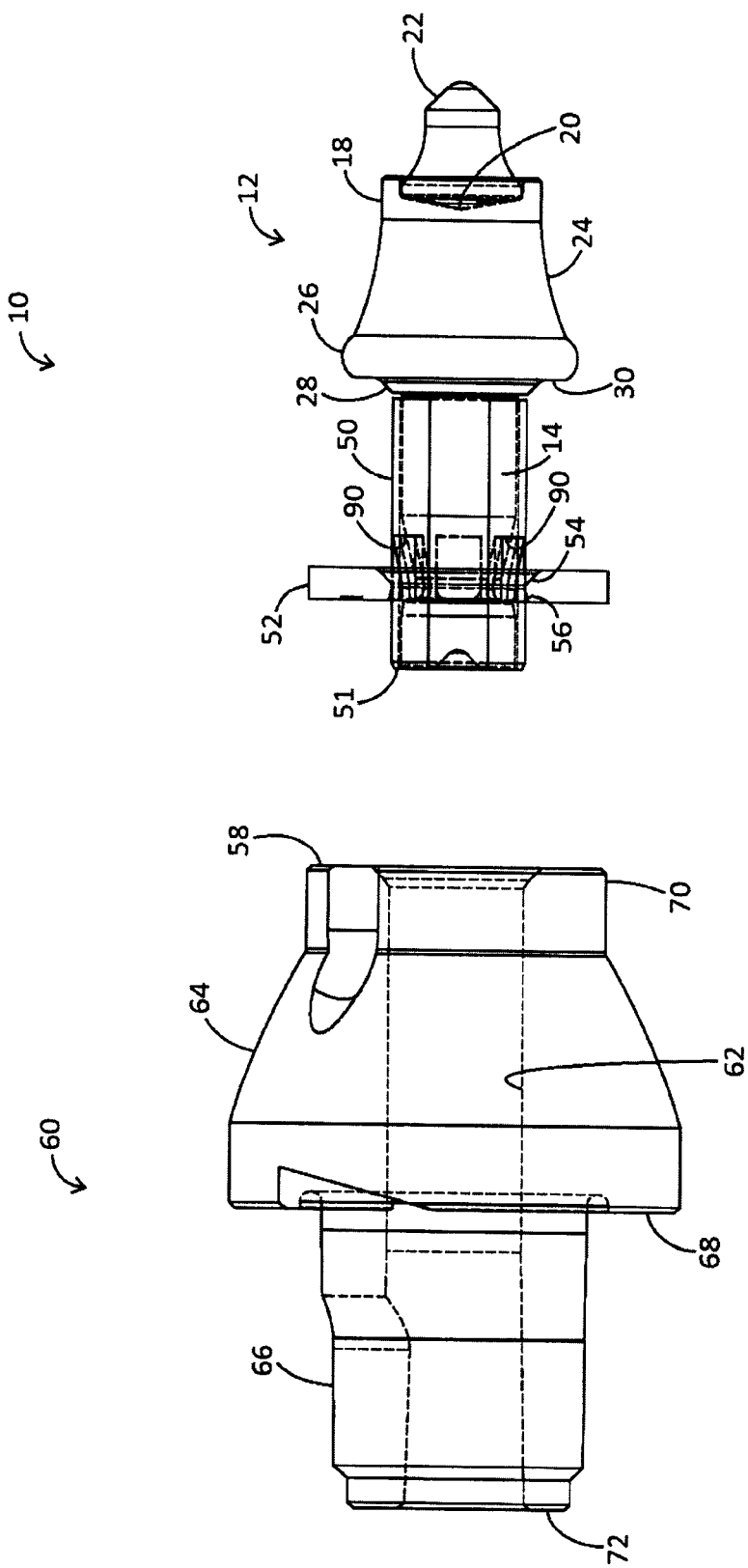
FIG. 25 is an elevation view of the first illustrated embodiment of the bit, assembled with the washer and the retainer, prior to the insertion of the bit in the bore of the bit holder, in accordance with implementations of this disclosure.
Figure 26:
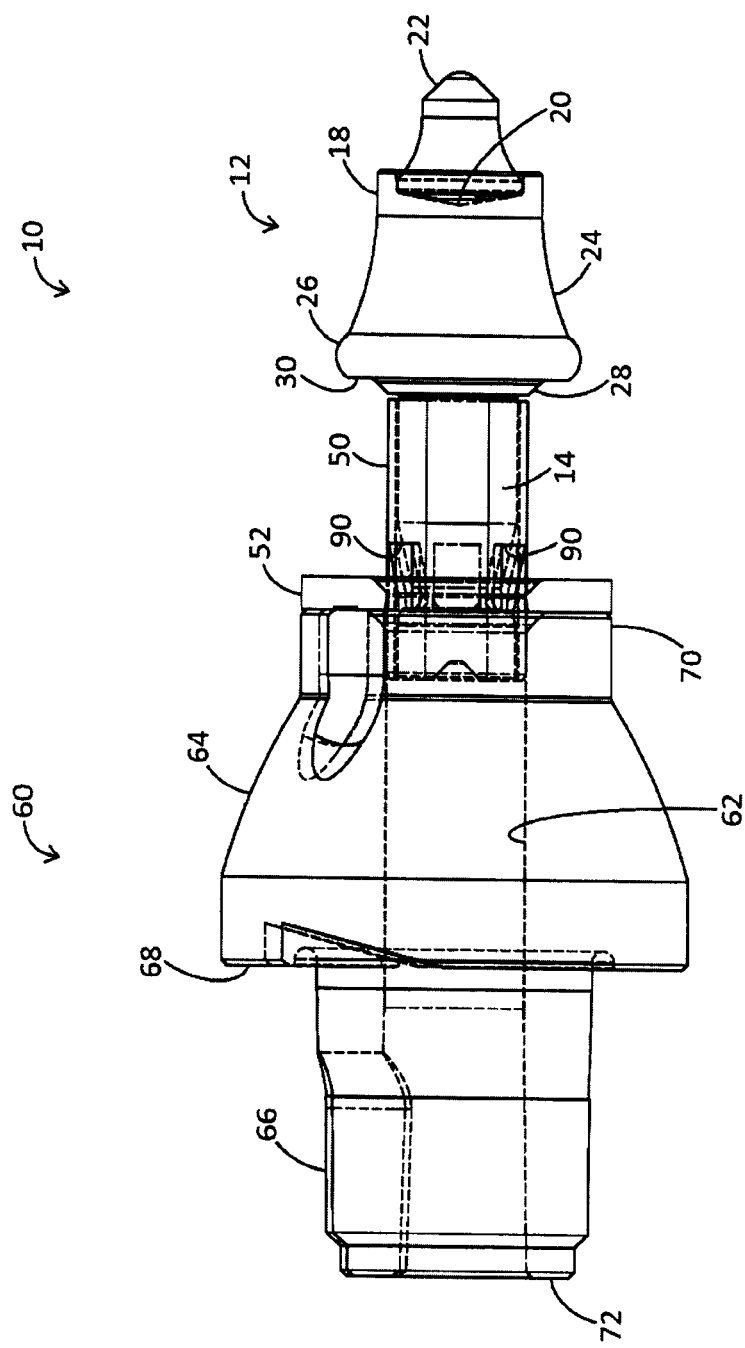
FIG. 26 is an elevation view of the first illustrated embodiment of the bit, assembled with the washer and the retainer, during insertion of the bit in the bore of the bit holder, in accordance with implementations of this disclosure.
Figure 27:
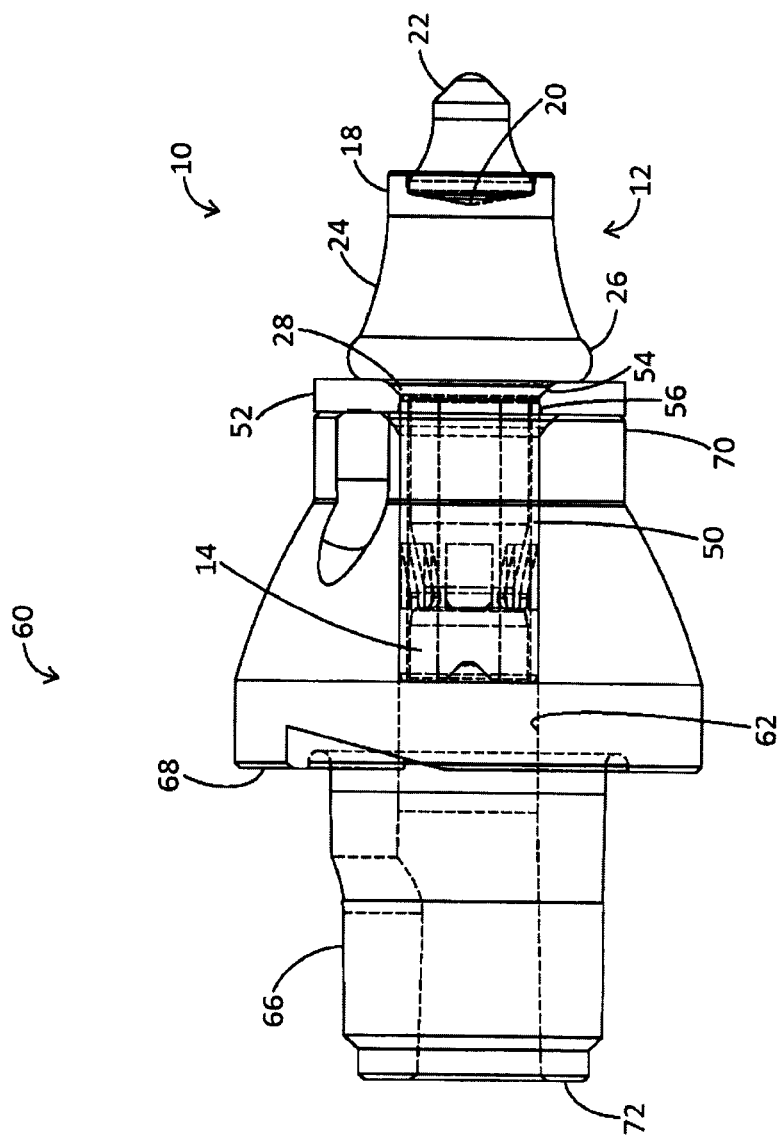
FIG. 27 is an elevation view of the first illustrated embodiment of the bit, assembled with the washer and the retainer, after insertion of the bit in the bore of the bit holder, in accordance with implementations of this disclosure

Assembly of the bit 10 and bit holder 60 is shown in FIGS. 25-27. Prior to assembly of the bit 10 in the bit holder 60, shown in FIG. 25, the shank 14 of the bit 10 is inserted into the retainer 50 which is then inserted into the bore of the washer 52. During assembly of the bit 10 in the bore 62 of the bit holder 60, shown in FIG. 26, the bit 10, in the first illustrated embodiment, is inserted into the bore 62 of the bit holder 60. The slot (not shown) of the retainer 50 allows the retainer 50 to radially compress when inserted into the bore 62 of the bit holder 60, forming an interference contact or interference fit between the retainer 50 and the bore 62 of the bit holder 60. After assembly of the bit 10 in the bit holder 60, shown in FIG. 27, the force between the retainer 50 and the bore 62 of the bit holder 60 maintains and retains the bit 10 in the bit holder 60. The decreased diameter tapered distal portion 28 and the first inner portion 54 of the washer 52 are adapted to support compressibility of the forward end 80 of the retainer 50 and provide a bore wear compensating feature and to allow self-centering of the bit 10 in the bore 62 of the bit holder 60. When in use, the washer 52 does not rotate and is adapted to protect the front face 58 of the bit holder 60

When the rear face 78 of the washer 52 is nearly fully seated on the front face 58 of the bit holder 60, a forward end 80 of the retainer 50 radially collapses in diameter and then recovers to a diameter 94 of the retainer 50 to match a diameter 74 of the bore 62 of the bit holder 60 after the axial insertion forces applied to the bit 10 have stopped. When the third inner portion 56 of the washer 52 engages the forward end 80 of the retainer 50 due to the axial rearward thrust applied to the cutting end of the bit 10, the washer 50 becomes static and does not rotate, which drastically reduces nose wear on the bit holder 60 and allows the bit 10 and the washer 50 to withstand impact thrust forces due to the radial compressibility of the forward end 80 of the slotted retainer 50. The collapsed retainer 50 acts as a radial spring and provides a cushioning aspect. The force between the retainer 50 and the bit holder bore 62 maintains and retains the bit 10 in the bit holder 60. The retainer 50 extends forward of the front face 58 of the bit holder 60 a distance 88. The forward end 80 of the retainer 50 intersects a location on an angle of the third inner portion 56 of the washer 52 to allow interaction between these components and allow these components to self-center. The bit 10 and the bit holder 60 are axially aligned when assembled together to form part of the bit assembly. The diameter 94 of the collapsing retainer 50 provides bore wear compensation and continues to match the inner diameter 74 of the bore 62 of the bit holder 60 until the bit holder 60 needs to be replaced.

Over time, the forces, vibrations, and loose abrasive materials exerted on the bit 10 through road milling, mining, and trenching operations wear away at the bit 10 and the bit holder bore 62, increasing the diameter 74 of the bit holder bore 62. Bits 10 are typically replaced every 1-2 days. Each time a new bit 10 is driven into the bit holder 60, the washer 52 is driven towards the front face 58 of the bit holder 60 and self-centers the bit 10 to the bore 62 of the bit holder 60. To prolong the life of the bit holder 60, the diameter 94 of the retainer 50 is expanded to match the diameter 74 of the bit holder bore 62. As the diameter 74 of the bit holder bore 62 increases due to bore wear, the axial rearward thrust applied to the cutting end of the bit 10 forces the washer 52 to radially collapse the forward end 80 of the retainer 50 in diameter and then the diameter 94 of the retainer 50 recovers to match the diameter 74 of the bit holder bore 62 after the insertion forces applied to the bit 10 have stopped, which restores the interference fit between the bit 10 and the bit holder 60. The increase in diameter 74 of the bit holder bore 62 and the diameter 94 of the retainer 50 decreases the distance 88 the retainer 50 extends forward of the front face 58 of the bit holder 60 and decreases a distance 89 from where the forward end 80 of the retainer 50 intersects the location on an angle of the third inner portion 56 of the washer 52 and the rear face 78 of the washer 52.

For illustration purposes, an exemplary first illustrated embodiment of the bit 10 is shown at three exemplary stages of the life time of a bit holder 60. FIGS. 1-8 and 28-29 show the bit 10 and a new bit holder 60. FIGS. 9-16 and 30-31 show the bit 10 and the bit holder 60 when the diameter 74 of the bore 62 of the bit holder 60 is worn approximately 0.006 inch. FIGS. 17-24 and 32-33 show the bit 10 and the bit holder 60 when the diameter 74 of the bore 62 of the bit holder 60 is worn approximately 0.016 inch.

Figure 28:
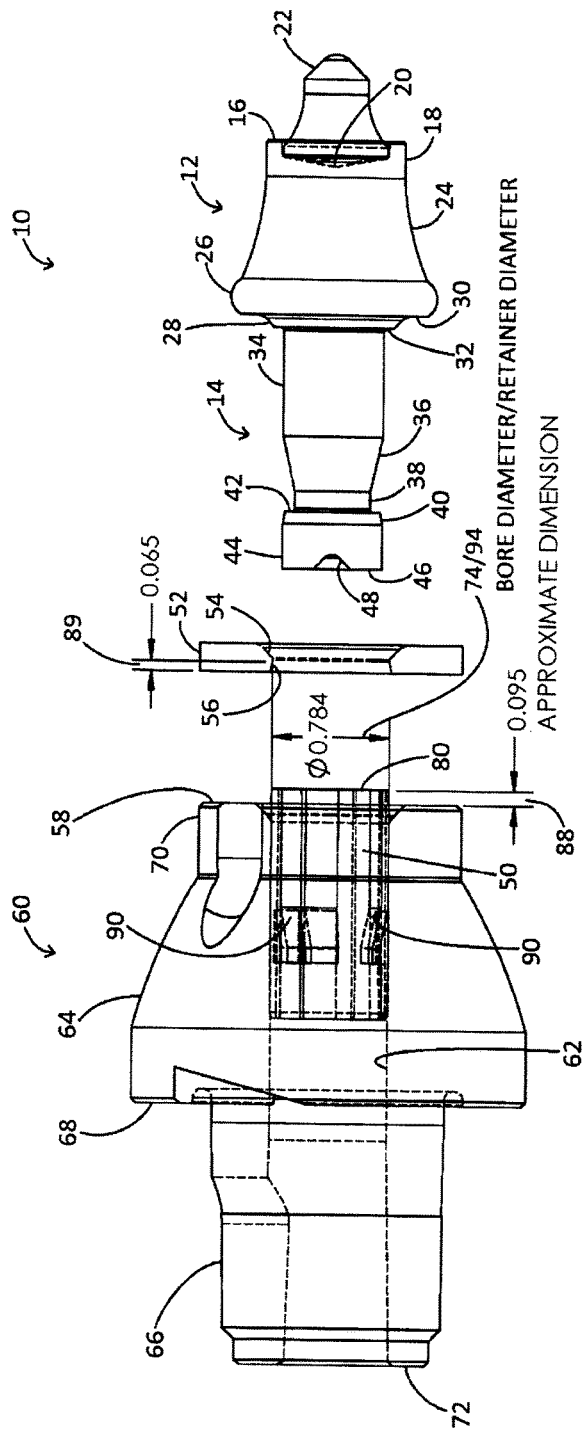
FIG. 28 is an exploded view of the first illustrated embodiment of the bit and the washer, the retainer of the bit shown retained within the bore of the bit holder when the diameter of the bore and the diameter of the retainer are approximately 0.784 inch, in accordance with implementations of this disclosure.
Figure 29:
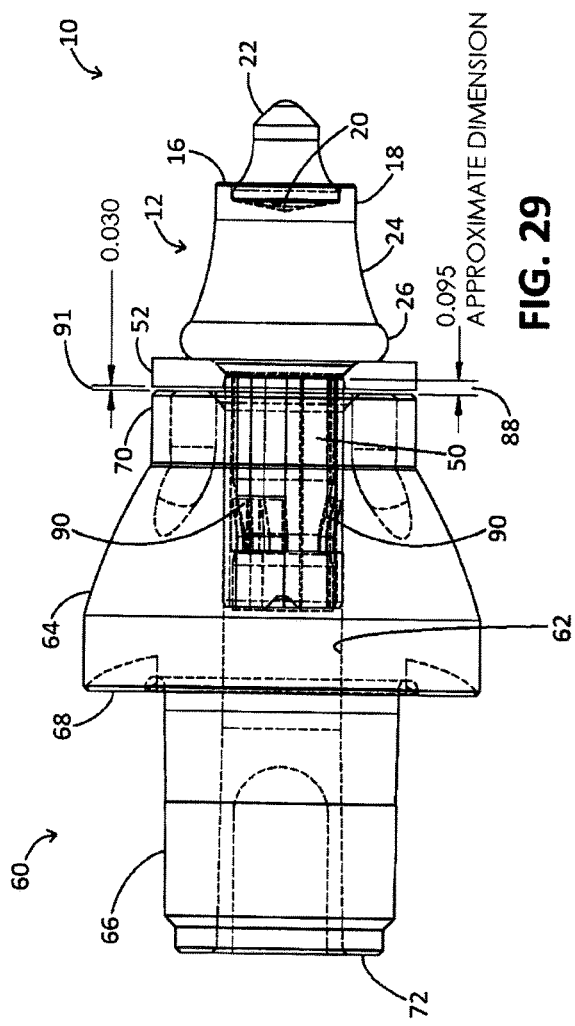
FIG. 29 is an elevation view of the first illustrated embodiment of the bit, assembled with the washer and retainer, after insertion of the bit in the bore of the bit holder, when the diameter of the bore and the diameter of the retainer are approximately 0.784 inch, in accordance with implementations of this disclosure.
Figure 34:
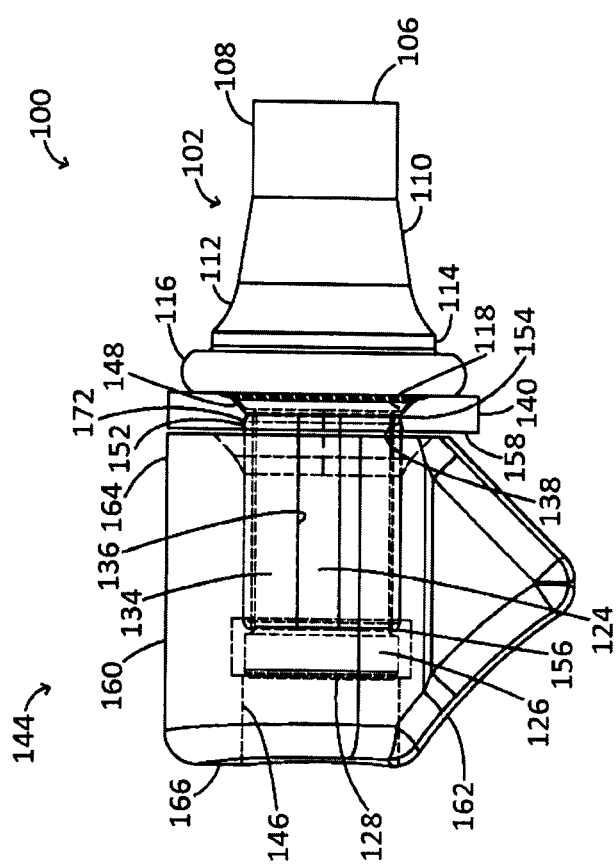
FIG. 34 is a side elevation view of a second illustrated embodiment of a bit, including a retainer, and a washer, shown after insertion of the bit in a bore of a base block, and showing invisible internal elements in dotted lines, in accordance with implementations of this disclosure.
Figure 37:
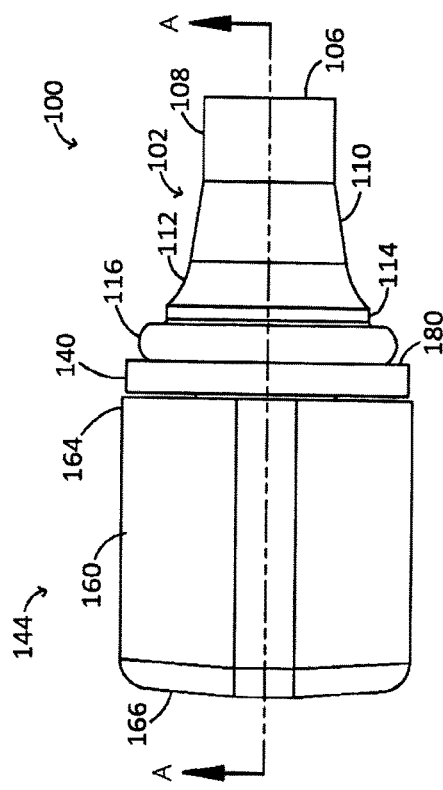
FIG. 37 is a top elevation view of the second illustrated embodiment of the bit and the washer, shown after insertion of the bit in the bore of the base block, in accordance with implementations of this disclosure.

Referring to FIGS. 1-8 and 28-29, when the bit holder 60 is new, the diameter 74 of the bore 62 of the bit holder 60 is a nominal 0.784 inch, as shown in FIGS. 8 and 28. The diameter 74, however, may be varied depending on the applicable circumstances. The initial diameter 94 of the retainer 50 may also be varied depending on the applicable circumstances. The initial diameter 94 of the retainer 50 is then pre-compressed to a diameter smaller than the diameter 74 of the bit holder bore 62 to allow manual pre-insertion of the shank 14 into the bit holder bore 62. When assembling, the distance 88 occurs between the front face 58 of the bit holder 60 and a first location 82 of the third inner portion 56 of the washer when the bit 10 assembly is inserted into the bore 62 of the bit holder 60. When the rear face 78 of the washer 52 is nearly fully seated on the front face 58 of the bit holder 60, shown in FIGS. 1-3 and 29, the third inner portion 56 of the washer 52 engages the forward end 80 of the retainer 50 at the first location 82 and the forward end 80 of the retainer 50 radially collapses in diameter and then recovers to the diameter 94 (FIG. 8) that matches the 0.784 inch diameter 74 of the bore 62 of the bit holder 60, shown in FIGS. 7, 8, and 29, after the insertion forces to the bit 10 have stopped. When the diameter 74 of the bit holder bore 62 and the diameter 94 of the retainer 50 are approximately 0.784 inch, the distance 88 between the front face 58 of the bit holder 60 and the first location 82 of the third inner portion 56 of the washer 52 is approximately 0.095 inch, as shown in FIGS. 8 and 29, the distance 89 that the first location 82 is inward from the rear face 78 of the washer 52 is approximately 0.065 inch, as shown by Detail C in FIG. 7 and in FIG. 28, and a distance 91 that the rear face 78 of the washer 52 is from the front face 58 of the bit holder 60 is approximately 0.030 inch, as shown in FIG. 29. FIGS. 8 and 28, which show the retainer 50 within the bore 62 of the bit holder 60, are strictly to illustrate the dimensions of the diameter 74 of the bore 62 and the diameter 94 of the retainer 50 and to demonstrate the approximate distance the forward end 80 of the retainer 50 extends past the front face 58 of the bit holder 60 in this exemplary illustrated embodiment.

Figure 16:
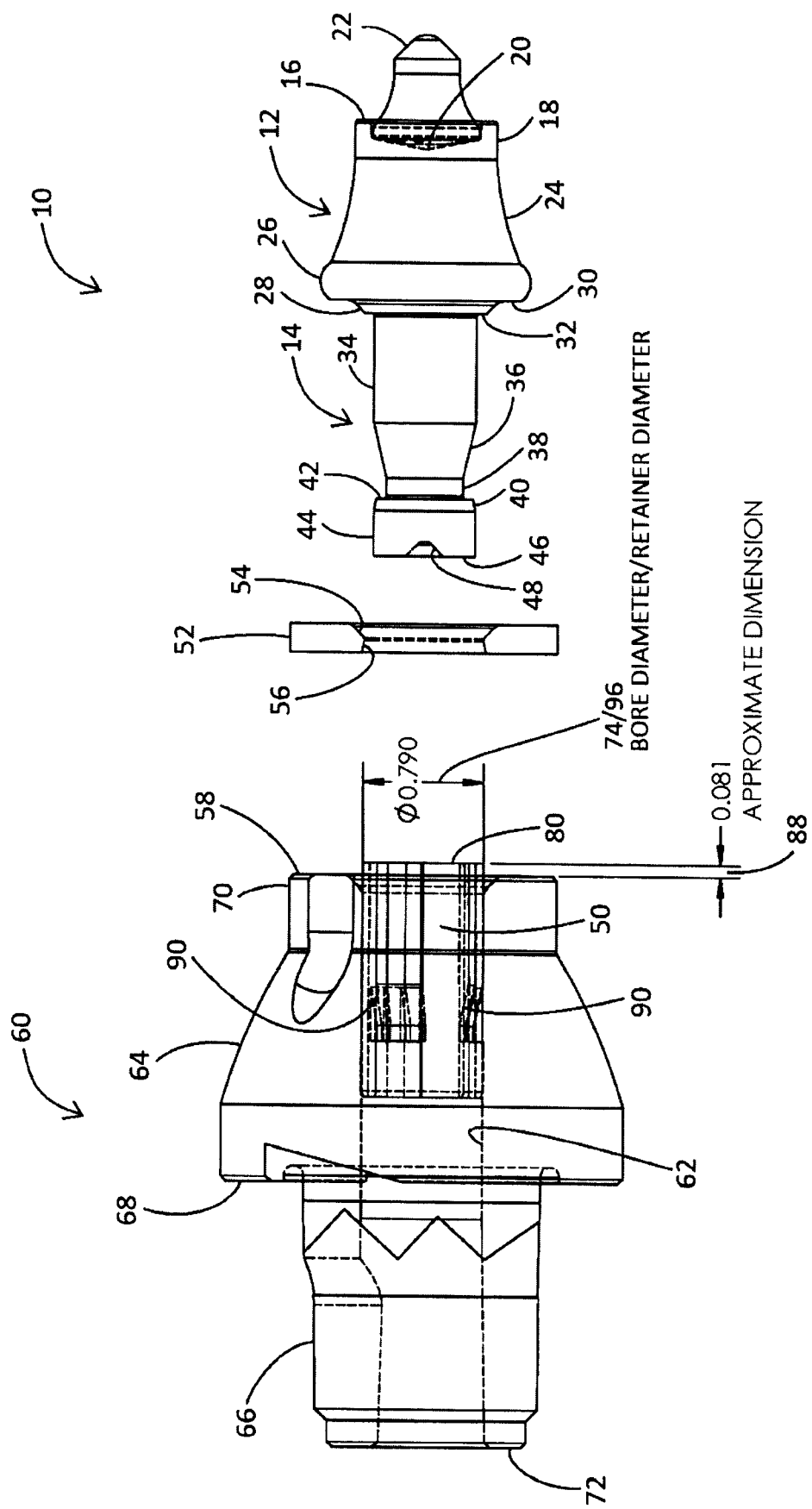
FIG. 16 is an exploded view of the first illustrated embodiment of the bit and the washer, the retainer of the bit shown retained within the bore of the bit holder when the bore of the bit holder is worn approximately 0.006 inches and the diameter of the bore and the diameter of the retainer are approximately 0.790 inch, in accordance with implementations of this disclosure.
Figure 23:
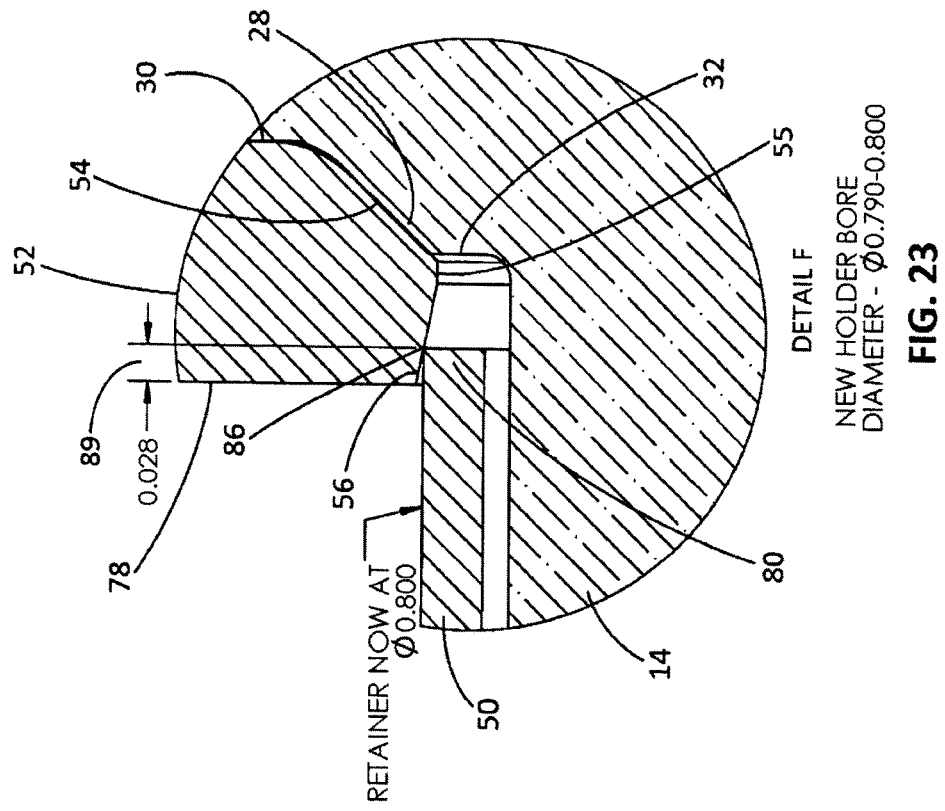
FIG. 23 is a detail cross-sectional view of Detail F of the first illustrated embodiment of the bit and the washer of FIG. 22, the bit shown with the retainer disposed around the shank of the bit when the bore of the bit holder is worn approximately 0.016 inches and the diameter of the retainer is approximately 0.800 inch, in accordance with implementations of this disclosure.
Figure 21:
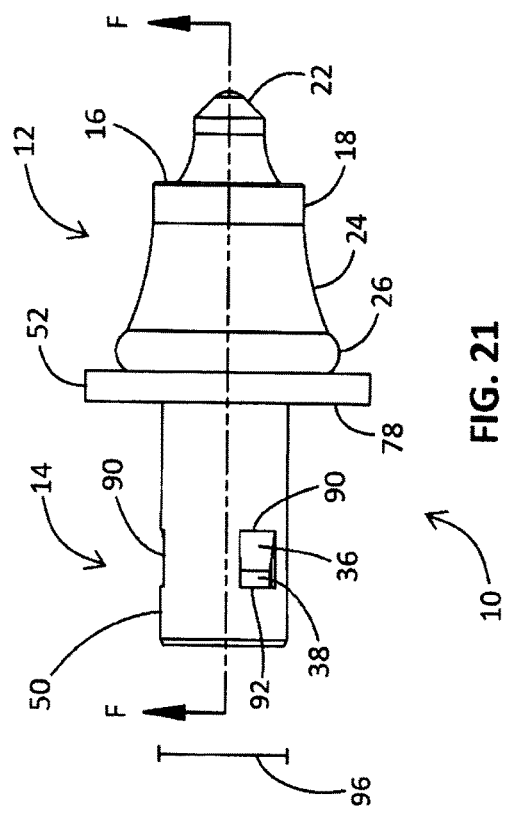
FIG. 21 is a top elevation view of the first illustrated embodiment of the bit and the washer, shown with the retainer disposed around the forward end of the shank of the bit when assembled into the bore of the bit holder, in accordance with implementations of this disclosure.
Figure 22:
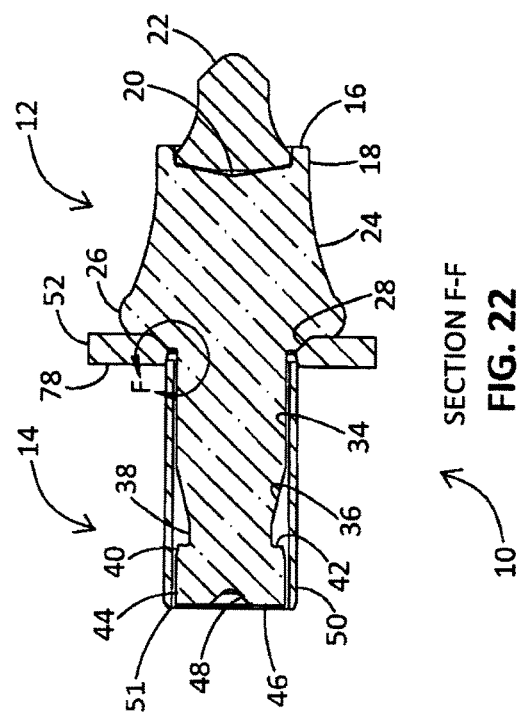
FIG. 22 is a cross-sectional view of the first illustrated embodiment of the bit and the washer taken along Line F-F of FIG. 21, the bit shown with the retainer disposed around the shank of the bit and showing Detail F, in accordance with implementations of this disclosure.

In this exemplary first illustrated embodiment, FIGS. 9-16 and 30-31 show the bit 10 and bit holder 60 when the bore 62 of the bit holder 60 is worn approximately 0.006 inch. When the bit holder bore 62 is worn approximately 0.006 inch, the diameter 74 of the bit holder bore 62 is approximately 0.790 inch, shown in FIGS. 16 and 30. The forces and vibrations exerted on the bit assembly when it is in use apply an axial rearward thrust to the cutting end of the bit 10, causing a second location 84 of the third inner portion 56 of the washer 52 to engage the forward end 80 of the retainer 50 and radially collapse the forward end 80 of the retainer 50 in diameter. The diameter 94 (FIG. 13) of the retainer 50 then recovers to a second diameter 96 (FIG. 16) that matches the 0.790 inch diameter 74 of the bit holder bore 62, at which time the washer 52 becomes static and will not rotate and restores the interference fit between the bit 10 and the bit holder 60. The increase in diameter of the diameter 74 of the bit holder bore 62 and the second diameter 96 of the retainer 50 decreases the distance 88 between the front face 58 of the bit holder 60 and the second location 84 of the third inner portion 56 of the washer 52. When the diameter 74 of the bit holder bore 62 and the second diameter 96 of the retainer 50 are approximately 0.790 inch, the distance 88 between the front face 58 of the bit holder 60 and the second location 84 of the third inner portion 56 of the washer 52 is approximately 0.081 inch, as shown in FIGS. 16 and 31, the distance 89 that the second location 84 is inward from the rear face 78 of the washer 52 is approximately 0.051 inch, as shown by Detail E in FIG. 15 and in FIG. 30, and the distance 91 that the rear face 78 of the washer 52 is from the front face 58 of the bit holder 60 is approximately 0.030 inch, as shown in FIG. 31. FIGS. 16 and 30, which show the retainer 50 within the bore 62 of the bit holder 60, are strictly to illustrate the dimensions of the diameter 74 of the bore 62 and the second diameter 96 of the retainer 50 and to demonstrate the approximate distance the forward end 80 of the retainer 50 extends past the front face 58 of the bit holder 60 in this exemplary first illustrated embodiment.

Figure 24:
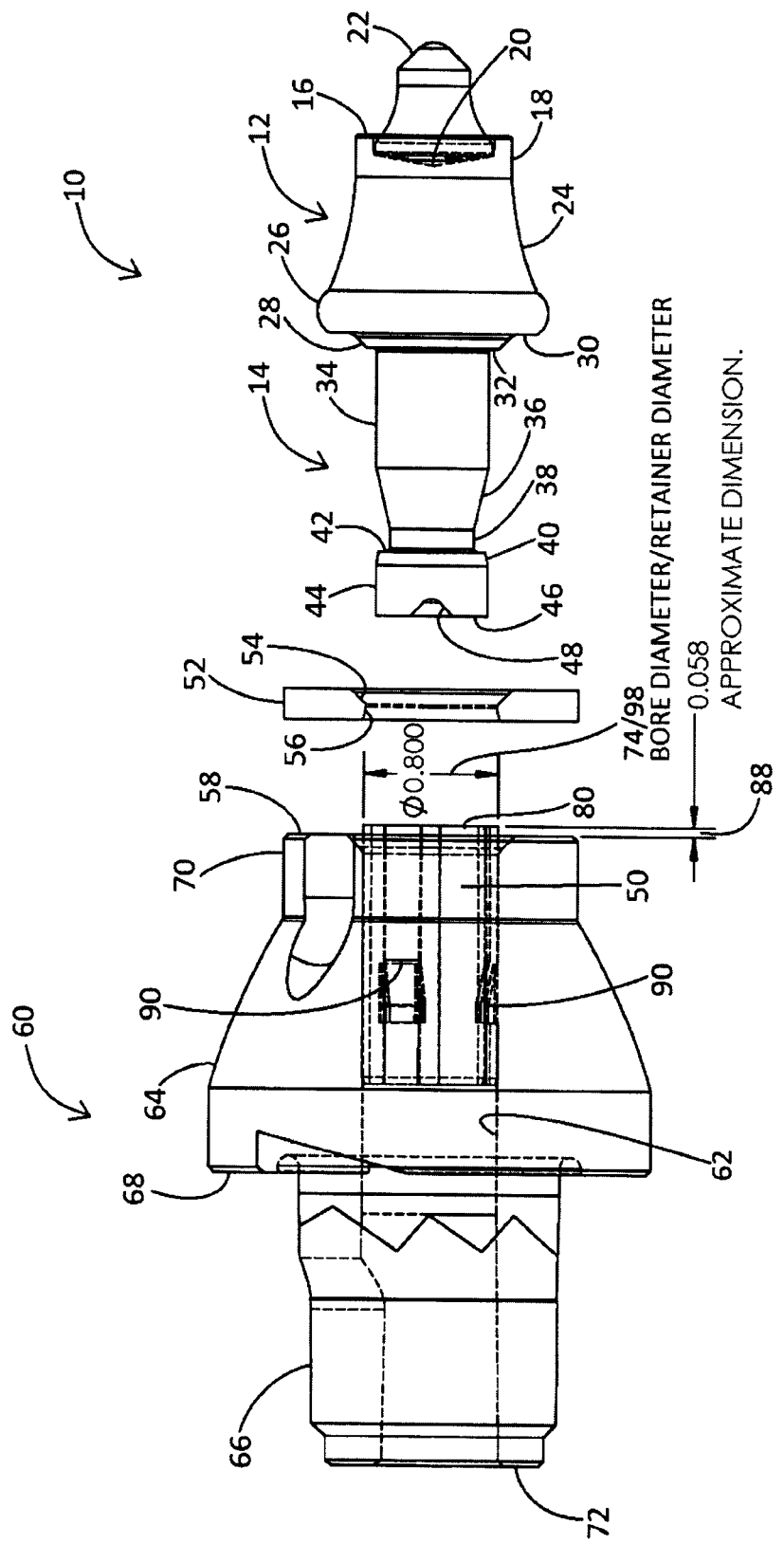
FIG. 24 is an exploded view of the first illustrated embodiment of the bit and the washer, the retainer of the bit shown retained within the bore of the bit holder when the bore of the bit holder is worn approximately 0.016 inches and the diameter of the bore and the diameter of the retainer are approximately 0.800 inch, in accordance with implementations of this disclosure.

In this exemplary first illustrated embodiment, FIGS. 17-24 and 32-33 show the bit 10 and bit holder 60 when the bore 62 of the bit holder 60 is worn approximately 0.016 inch. When the bit holder bore 62 is worn approximately 0.016 inch, the diameter 74 of the bit holder bore 62 is approximately 0.800 inch. The forces and vibrations exerted on the bit assembly when it is in use apply an axial rearward thrust to the cutting end of the bit 10, causing a third location 86 of the third inner portion 56 of the washer 52 to engage the forward end 80 of the retainer 50 and radially collapse the forward end 80 of the retainer 50 in diameter. The second diameter 96 (FIG. 21) of the retainer 50 then recovers to a third diameter 98 (FIG. 23) that matches the 0.800 inch diameter 74 of the bit holder bore 62, at which time the washer 52 becomes static and will not rotate and restores the interference fit between the bit 10 and the bit holder 60. The increase in diameter of the diameter 74 of the bit holder bore 62 and the third diameter 98 of the retainer 50 decreases the distance 88 between the front face 58 of the bit holder 60 and the second location 84 of the third inner portion 56 of the washer 52. When the diameter 74 of the bit holder bore 62 and the third diameter 98 of the retainer 50 are approximately 0.800 inch, the distance 88 between the front face 58 of the bit holder 60 and the third location 86 of the third inner portion 56 of the washer 52 is approximately 0.058 inch, as shown in FIGS. 24 and 32, the distance 89 that the third location 86 is inward from the rear face 78 of the washer 52 is approximately 0.028 inch, as shown by Detail B in FIG. 23 and in FIG. 32, and the distance 91 that the rear face 78 of the washer 52 is from the front face 58 of the bit holder 60 is approximately 0.030 inch, as shown in FIG. 33. FIGS. 24 and 32, which show the retainer 50 within the bore 62 of the bit holder 60, are strictly to illustrate the dimensions of the diameter 74 of the bore 62 and the third diameter 98 of the retainer 50 and to demonstrate the approximate distance the forward end 80 of the retainer 50 extends past the front face 58 of the bit holder 60 in this exemplary illustrated embodiment.

As the diameter 74 of the bit holder bore 62 increases, the diameter of the retainer 50 then increases to the diameter 74 of the bit holder bore 62 to reform the interference contact between the retainer 50 and the bit holder 60. The process continues until the distance 89 between the rear face 78 of the washer 52 and the intersection of the forward end 80 of the retainer and the angle of the third inner portion 56 decreases to a point where the angle of the third inner portion 56 of the washer 52 can no longer collapse the retainer 50. When the bit holder bore 62 is worn beyond this point, and the diameter of the retainer 50 can no longer expand to the diameter 74 of the bit holder bore 62, the bit holder 60 must be replaced. The process also varies depending on the size of the shank 14.

Referring to FIGS. 34-38, a second illustrated embodiment of a bit 100 comprises a bit body 102 and a bit shank 104 axially depending from a bottom of the bit body 102. The bit body 102 is generally cylindrical or generally annular in shape and comprises an annular or generally cylindrical top surface 106, such as a nearly flat annular or flat generally cylindrical top surface in the second illustrated embodiment, adjacent to an upper body portion 108 that includes an annular or generally cylindrical trough (not shown) in which to retain a bit tip (not shown). A first mediate body portion 110 subjacent the upper body portion 108 generally slopes axially and radially outwardly to a second mediate body portion 112. The second mediate body portion 112 subjacent the first mediate body portion 110 generally slopes axially and outwardly to a generally cylindrical or generally annular third mediate body portion 114. Subjacent the third mediate body portion 114 is a radially extending generally arcuate tire portion 116 that is coaxial with the bit body 102. A decreased diameter tapered distal portion 118 extends from a first flange 120, subjacent to the tire portion 116, to a second flange 122. The first flange 120 and the second flange 122 may be flat annular or generally cylindrical flanges as shown in this second illustrated embodiment.

Figure 38:
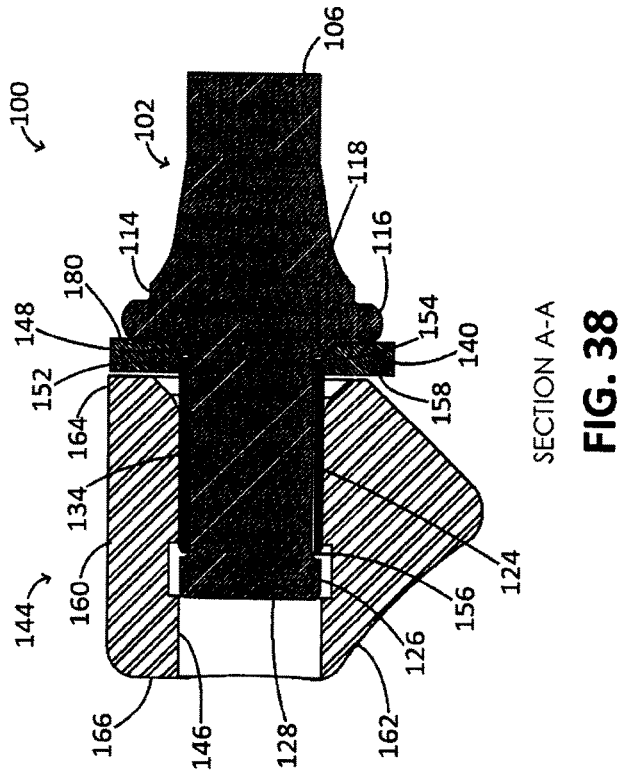
FIG. 38 is a cross-sectional view of the second illustrated embodiment of the bit and the washer, taken along Line G-G of FIG. 37, in accordance with implementations of this disclosure.

The shank 104, shown in FIGS. 35 and 38, axially depends from the second flange 122 subjacent the decreased diameter tapered distal portion 118 of the bit body 102 and is axially aligned with the bit body 102. The shank 104 comprises a generally cylindrical decreased diameter forward segment 124 that axially extends from the second flange 122 adjacent the decreased diameter tapered distal portion 118 to a generally cylindrical increased diameter lower segment 126 adjacent a distal end 128 of the shank 104. A diameter 130 of the increased diameter lower segment 126 has the same, similar, or complementary dimensions as an outer diameter 132 of the second flange 122, shown in FIG. 35. In other embodiments, the shank 104 can be cylindrical or can include tapered and/or arcuate segments.

The shank 104 includes a coaxial and generally cylindrical collapsible slotted retainer 134, shown in FIGS. 34-36 and 38, that is disposed circumferentially about the shank 104. The retainer 134 is generally made from spring steel or other hardenable material with an elasticity that allows the retainer 134 to return to its nearly original shape despite significant deflection or twisting. The axial length of the retainer 134 is shorter than the axial length of the shank 104 as shown in this second illustrated embodiment. The retainer 134 extends from a forward end 154 to a distal end 156 of the retainer 134 within the axial length of the generally cylindrical decreased diameter forward segment 124. In alternate embodiments (not shown), the retainer 134 may be approximately the same length or longer than the shank 104. The retainer 134 comprises a slot 136 (FIGS. 34-36) that axially extends along the length of the retainer 134, from the forward end 154 to the distal end 156 of the retainer 134, and creates a narrow gap between opposing sidewalls of the slot 136.

A washer 140, that comprises an anti-rotation design, is disposed circumferentially about the retainer 134 and the shank 104 and is adapted to cover and protect a front face 142 of a base block 144 and to provide near perfect centerline alignment of the bit 100 and a bore 146 of the base block 144, or a bit holder in another implementation. A bore (not shown) extends from a front face 180 to a rear face 158 of the washer 140 and includes a first inner portion 148, a second generally cylindrical or slightly flat second inner portion 150, and a third inner portion 152, shown in FIG. 35, where the first inner portion 148 is adjacent the second inner portion 150 and the third inner portion 152 is subjacent the second inner portion 150. The first inner portion 148 is tapered to comprise the same, similar, or complementary dimensions as the dimensions of the decreased diameter tapered distal portion 118. The diameter of the forward end 154 of the retainer 134 is larger than the diameter of the third inner portion 152. The third inner portion 152 comprises a reverse taper such that the angle of the reverse taper is adapted to urge the washer 140 away from the front face 142 of the base block 144 until the retainer 134 is fully inserted and an interference contact or interference fit is formed between the retainer 134 and the bore 146 of the base block 144. Additionally, the third inner portion 152 of the washer 140 surrounds the forward end 154 of the retainer 134 and creates a nearly 100% seal against the bore 146 cavity of the base block 144, which is adapted to prevent particles and debris from entering the bore 146 cavity and prevent additional bore wear.

The angle of the first inner portion 148 of the washer 140 creates a seat for the washer 140 to the decrease diameter tapered distal portion 118 of the bit body 102. The angle of the third inner portion 152 of the washer 140 determines how far away the washer 140 is from the front face 142 of the base block 144 and how much the third inner portion 152 can collapse the retainer 134 into the bore 146 of the base bock 144. Additionally, the angle of the third inner portion 152 of the washer 140 also creates a spring force by providing a radial compressive feature adapted to provide axial shock absorbing characteristics because the washer 140 is spaced away from the front face 142 of the base block 144. Changing the strength and the hardness of the steel of the retainer 134 and changing the angle of the third inner portion 152 of the washer 140, varies the distance the retainer 134 extends into the base block 144. The angle of the third inner portion 152 of the washer 140 is variable in order to change how far the retainer 134 extends into the base block 144. The angle of the third inner portion 152 (FIG. 35) in this exemplary second embodiment is greater than the angle of the third inner portion 56 (FIG. 4) in the exemplary first illustrated embodiment. A larger angle at the third inner portion 152 causes the forward end 154 of the retainer 134 to extend further from the front face 142 of the base block 144. A different angle is used in the third inner portion 56 of the first embodiment from the angle used in the third inner portion 152 of the second embodiment. The washer 52 used with the bit holder 60 of the first embodiment comprises a lesser angle on the third inner portion 56 than the angle used on the third inner portion 152 of the washer 140 used with the base block 144. A greater angle on the third inner portion 152 causes the washer 140 to be pushed forward more from the front face 142 of the base block 144.

In one exemplary implementation of the second illustrated embodiment, the first inner portion 148 of the washer 140 locates nearly on a 45 degree angle located on the decreased diameter tapered distal portion 118 subjacent the first flange 120 and tire portion 116. In this implementation, the third inner portion 152 of the washer 140 comprises a slight angle which intersects the rear face 158 of the washer 140 with the slight angular third inner portion 152 engaging the forward end 154 of the retainer 134 to achieve alignment between the shank 104 of the bit 100 and the bore 146 of the base block 144.

The base block 144, shown in FIGS. 34-38, or a bit holder in an alternate implementation, comprises a receiving portion 160 and a base 162. The base 162 can be flat or slightly concave to fit a drum or additional mounting plates on which a singular or a plurality of base blocks can be mounted. The receiving portion 160 includes the base block bore 146, shown in FIGS. 34-36 and 38, which is symmetrical with the shank 104 along a centerline and extends from the front face 142 at a forward end 164 to a distal end 166 of the receiving portion 160 in this second illustrated embodiment. In this second illustrated embodiment, the diameter of the bore 146 varies along the length of the bore 146 between the forward end 164 and the distal end 166 of the base block 144. In alternate embodiments, the diameter of the bore 146 may be continuous along the length of the bore 146.

Assembly of the bit 100 and the base block 144 is shown in FIGS. 34 and 36-38. Prior to assembly of the bit 100 in the base block 144, the shank 104 of the bit 100 is inserted into the retainer 134 which is then inserted into the bore of the washer 140. During assembly of the bit 100 in the bore 146 of the base block 144, the bit 100, in the second illustrated embodiment, is inserted into the bore 146 of the base holder 144. The slot 136 of the retainer 134 allows the retainer 134 to radially compress when inserted into the bore 146 of the base block 144, forming an interference contact or interference fit between the retainer 134 and the bore 146 of the base block 144. After assembly of the bit 100 in the base block 144, shown in FIGS. 34 and 36-38, the radial force between the retainer 134 and the bore 146 of the base block 144 maintains and retains the bit 100 in the base block 144. The decreased diameter tapered distal portion 118 and the first inner portion 148 of the washer 144 are adapted to support the compressibility of the forward end 154 of the retainer 134 and to provide a bore wear compensating feature and to allow self-centering of the bit 100 in the bore 146 of the base block 144. When in use, the washer 140 does not rotate and is adapted to protect the front face 142 of the base block 144.

When the rear face 158 of the washer 140 is nearly fully seated on the front face 142 of the base block 144, the forward end 154 of the retainer 134 radially collapses in diameter and then recovers to the diameter 168 of the retainer 134 to match the diameter 170 of the bore 146 of the base block 144 after the axial insertion forces applied to the bit 100 have stopped. When the third inner portion 152 of the washer 140 engages the forward end 154 of the retainer 134 due to the axial rearward thrust applied to the cutting end of the bit 100, the washer 140 becomes static and does not rotate, which drastically reduces nose wear on the base block 144 and allows the bit 100 and the washer 140 to withstand impact thrust forces due to the radial compressibility of the forward end 154 of the slotted retainer 134. The collapsed retainer 134 acts as a radial spring and provides a cushioning aspect. The force between the retainer 134 and the base block bore 146 maintains and retains the bit 100 in the base block 144. The retainer 134 extends forward of the front face 142 of the base block a distance 172. A location 138 adjacent the forward end 154 of the retainer 134 intersects a location on an angle of the third inner portion 152 of the washer 140 to allow interaction between these components and allow these components to self-center. The bit 100 and the base block 144 are axially aligned when assembled together to form part of the bit assembly. The diameter 168 of the collapsing retainer 134 provides bore wear compensation and continues to match the inner diameter 170 of the bore 146 of the base block 144 until the base block 144 needs to be replaced.

Over time, the forces, vibrations, and loose abrasive materials exerted on the bit 100 through road milling, mining, and trenching operations wear away at the bit 100 and the base block bore 146, increasing the diameter 170 of the base block bore 146. Bits 100 are typically replaced every 1-2 days. Each time a new bit 100 is driven into the base block 144, the washer 140 is driven towards the front face 142 of the base block 144 and self-centers the bit 100 to the bore 146 of the base block 144. To prolong the life of the base block, the diameter 168 of the retainer 134 is expanded to match the diameter 170 of the base block bore 146. As the diameter 170 of the base block bore 146 increases due to bore wear, the axial rearward thrust applied to the cutting end of the bit 100 forces the washer 140 to radially collapse the forward end 154 of the retainer 134 in diameter and then the diameter 168 of the retainer 134 recovers to match the diameter 170 of the base block bore 146 after the insertion forces applied to the bit 100 have stopped, which restores the interference fit between the bit 100 and the base block 144. The increase in diameter 170 of the base block bore 146 and the diameter 168 of the retainer 134 decreases the distance 174 the retainer 134 extends forward of the front face 142 of the base block 144 and decreases a distance 174 from where the forward end 154 of the retainer 134 intersects the location on an angle of the third inner portion 152 of the washer 140 and the rear face 158 of the washer 140.

For illustration purposes, an exemplary second illustrated embodiment of the bit 100 is shown at an exemplary stage of the life time of a base block 144. FIGS. 35 and 36 show the bit 100 and a base block 144 when the diameter 170 of the bore 146 of the base block 144 is approximately 0.882 inch. Referring to FIGS. 35 and 36, the diameter 170 of the bore 146 of the base block 144 is a nominal 0.882 inch. The diameter 170, however, may be varied depending on the applicable circumstances. The initial diameter of the retainer 134 may also be varied depending on the applicable circumstances. The forces and vibrations exerted on the bit assembly when it is in use apply an axial rearward thrust to the cutting end of the bit 100, causing a location 172 of the third inner portion 152 of the washer 140 to engage the forward end 154 of the retainer 134 and radially collapse the forward end 154 of the retainer 134 in diameter. The diameter 168 of the retainer 134 then recovers to match the 0.882 inch diameter 170 of the base block bore 146, at which time the washer 140 may move forward to restore the interference fit between the bit 100 and the base block 146. The increase in diameter of the diameter 170 of the base block bore 146 and the diameter 168 of the retainer 134 decreases the distance 174 between the front face 142 of the base block 144 and the location 172 of the third inner portion 152 of the washer 140. When the diameter 170 of the base block bore 146 and the diameter 168 of the retainer 134 are approximately 0.882 inch, the distance 174 between the front face 142 of the base block 144 and the forward end 154 of the retainer 134 is approximately 0.112 inch, as shown in FIGS. 35 and 36, the distance 176 between the location 172 and the rear face 158 of the washer 140 is approximately 0.041 inch, as shown in FIG. 35, and the distance 174 between the rear face 158 of the washer 140 and the front face 142 of the base block 144 is approximately 0.030 inch when the bit 100 is assembled in the base block 144, as shown in FIG. 36. FIG. 35, which shows the retainer 134 within the bore 146 of the base block 144, is strictly to illustrate the dimensions of the diameter 170 of the bore 146 and the diameter 168 of the retainer 134 and to demonstrate the approximate distance the forward end 154 of the retainer 134 extends past the front face 142 of the base block 144 in this exemplary second illustrated embodiment.

As the diameter 170 of the base block bore 146 increases, the diameter of the retainer 134 then increases to the diameter 170 of the base block bore 146 to reform the interference contact between the retainer 134 and the base block 144. The process continues until the distance 176 between the rear face 158 of the washer 140 and the intersection of the forward end 154 of the retainer 134 and the angle of the third inner portion 152 decreases to a point where the angle of the third inner portion 152 of the washer 140 can no longer collapse the retainer 134. When the base block bore 146 is worn beyond this point, and the diameter of the retainer 134 can no longer expand to the diameter 170 of the base block bore 146, the base block 144 must be replaced. The process also varies depending on the size of the shank 104.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, "X includes at least one of A and B" is intended to mean any of the natural inclusive permutations. That is, if X includes A; X includes B; or X includes both A and B, then "X includes at least one of A and B" is satisfied under any of the foregoing instances. The articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect or implementation unless described as such.

While the present disclosure has been described in connection with certain embodiments and measurements, it is to be understood that the invention is not to be limited to the disclosed embodiments and measurements but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A bit comprising:
   an upper body portion;
   a generally cylindrical shank axially depending from the upper body portion;
   a retainer disposed circumferentially about the shank, the retainer comprising a slot axially extending along a length of the retainer; and
   a washer disposed circumferentially about the shank between the upper body portion and the retainer, the washer comprising a bore including an outwardly tapered first inner portion adjacent a rear face of the washer, the first inner portion abutting the retainer.

2. The bit of claim 1, further comprising:
   a generally cylindrical hollow body portion axially extending from a first end to a second end of the retainer; and
   the slot axially extending through a sidewall of the hollow body portion along a length of the hollow body portion.

3. The bit of claim 2, wherein the hollow body portion of the retainer is adapted to be collapsible and increase a diameter of the retainer.

4. The bit of claim 2, further comprising:
   at least one aperture through the sidewall of the hollow body portion, the at least one aperture disposed a predetermined distance from the second end of the retainer.

5. The bit of claim 2, further comprising:
   at least one tab inwardly positioned on a portion of the sidewall of the hollow body portion of the retainer, the at least one tab adapted to engage at least one recess on the shank of the bit to prevent the retainer from being removed from the shank when the bit is at least one of in use and extracted from a bore of a holder.

6. The bit of claim 2, further comprising:
   a narrow gap between a first side and a second side of the slot, the first side opposite the second side.

7. The bit of claim 1, wherein the retainer has a variable diameter.

8. The bit of claim 1, further comprising:
a second inner portion of the bore, the second inner portion adjacent the first inner portion of the bore;
a third inner portion of the bore, the third inner portion adjacent the second inner portion of the bore; and
the washer adapted to provide near centerline alignment of the bit and a bit holder.

9. The bit of claim 8, wherein the third inner portion of the bore comprises an angle that is adapted to allow a front face of the washer to seat on a bottom flange of the upper body portion of the bit.

10. The bit of claim 9, wherein the angle of the third inner portion is 45 degrees.

11. The bit of claim 8, wherein the second inner portion is one of generally cylindrical, generally annular, and nearly flat.

12. The bit of claim 8, the third inner portion of the bore tapered inwardly from a front face of the washer.

13. The bit of claim 8, further comprising:
a tapered portion of the upper body portion subjacent a flange of the upper body portion, the third inner portion of the bore complementary to the tapered portion.

14. The bit of claim 1, wherein the first inner portion of the bore comprises an angle that is adapted to engage a forward end of the retainer.

15. The bit of claim 14, wherein the angle of the first inner portion is adapted to urge the washer away from a front face of the bit holder, to collapse the retainer, and to increase a diameter of the retainer to form an interference fit with a bore of the bit holder.

16. The bit of claim 14, wherein the angle of the first inner portion is adapted to axially align the shank of the bit with a bore of the bit holder.

17. The bit of claim 1, wherein the washer is adapted to engage one of a first end of the retainer and a location adjacent the first end of the retainer and urge the washer away from a front face of the bit holder, to collapse the retainer and increase a diameter of the retainer to form an interference fit with a bore of a bit holder, and to axially align the bit and the bit bolder along a centerline.

18. The bit of claim 1, wherein the first inner portion surrounds a forward end of the retainer, the washer adapted to create a seal between the washer and a cavity of a bore of a bit holder and to prevent particles from entering at least one of the cavity and the bore.

19. The bit of claim 1, further comprising:
an angle of the first inner portion adapted to engage a forward end of the retainer to create a space between the rear face of the washer and a front face of a bit holder and the angle of the first inner portion adapted to create a spring force by providing a radial compressive feature that provides axial shock absorbing characteristics.

20. The bit of claim 1, further comprising:
a decreased diameter upper portion adjacent a forward end of the shank; and
an increased diameter lower portion subjacent the decreased diameter upper portion, the increased diameter lower portion adjacent a distal end of the shank.

21. The bit of claim 20, wherein the retainer is disposed circumferentially about the decreased diameter upper portion.

22. The bit of claim 20, wherein an axial length of the retainer is shorter than an axial length of the shank.

23. The bit of claim 20, further comprising:
a distal body portion axially depending from a first flange of the upper body portion; and
a second flange subjacent the distal body portion, the second flange having an outer diameter that is approximately a diameter of the increased diameter lower portion of the shank.

24. The bit of claim 1, the first inner portion of the bore tapered outwardly towards the rear face of the washer.

25. The bit of claim 1, further comprising:
a flange adjacent a distal end of the shank; and
at least one tab of the retainer adjacent a distal end of the retainer, the at least one tab adapted to engage the flange of the shank.

* * * * *